US012719572B1

(12) United States Patent
Ghasemi et al.

(10) Patent No.: US 12,719,572 B1
(45) Date of Patent: Aug. 25, 2026

(54) TOPOLOGY-AWARE HIERARCHICAL MACHINE LEARNING FOR SERVICE-CRITICAL FIBER ACCESS ANOMALIES

(71) Applicant: FRONTIER COMMUNICATIONS HOLDINGS, LLC, Dallas, TX (US)

(72) Inventors: Arman Ghasemi, Weatogue, CT (US); Milad Mostavi, San Antonio, TX (US); Yetik Serbest, Austin, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 19/447,237

(22) Filed: Jan. 13, 2026

(51) Int. Cl.
*H04B 10/079* (2013.01)
*H04Q 11/00* (2006.01)

(52) U.S. Cl.
CPC ..... *H04B 10/0795* (2013.01); *H04Q 11/0062* (2013.01); *H04Q 2011/0083* (2013.01)

(58) Field of Classification Search
None
See application file for complete search history.

(56) References Cited

U.S. PATENT DOCUMENTS 10,848,245 B2 * 11/2020 Takeshita .............. H04L 12/437
11,101,884 B1 * 8/2021 Campbell .......... H04B 10/0793
11,589,141 B2 * 2/2023 Xie .................... H04Q 11/0066
12,028,108 B1 * 7/2024 Mostavi ............. H04B 10/0791
12,191,906 B1 * 1/2025 Mostavi ............. H04Q 11/0067
12,267,102 B2 * 4/2025 Alaettinoglu ....... H04L 41/0668
12,375,174 B1 * 7/2025 Ghasemi ............ H04B 10/0795
2009/0220226 A1 9/2009 Hehmann et al.
2012/0093499 A1 4/2012 Dvir et al.
2012/0163800 A1 6/2012 Urban
2014/0233940 A1 8/2014 Pitzer
2015/0226788 A1 8/2015 Toda
2016/0187224 A1 6/2016 Chen et al.
2022/0345213 A1 10/2022 Tabet et al.
2026/0074784 A1 * 3/2026 Ji ....................... H04B 10/0791

OTHER PUBLICATIONS

Musumeci et al., A Tutorial on Machine Learning for Failure Management in Optical Networks, (Year: 2019).*
Office Action for U.S. Appl. No. 18/664,542, dated Jul. 30, 2024.
Office Action for U.S. Appl. No. 18/441,131, dated Apr. 5, 2024.

* cited by examiner

*Primary Examiner* — Jai M Lee

(57) ABSTRACT

A method for detecting an anomaly in a passive optical network (PON) includes obtaining data for a customer associated with a plurality of levels in a topology. The PON includes an optical line terminal (OLT) optically connected to a plurality of optical network terminals (ONTs) via optical fibers. The plurality of levels include two or more of: a local area network level corresponding to a wireless network component communicating with a customer ONT, an ONT level, a fiber distribution hub (FDH) level corresponding to an FDH optically connected to the customer ONT, or an OLT level corresponding to the OLT optically connected to the FDH. For each level, the method includes analyzing a data subset to generate a level-specific anomaly metric. The method includes combining the level-specific anomaly metrics to detect an anomaly and providing an indication to a user interface or another computing device.

20 Claims, 11 Drawing Sheets

TOPOLOGY-AWARE HIERARCHICAL MACHINE LEARNING FOR SERVICE-CRITICAL FIBER ACCESS ANOMALIES

FIELD OF THE DISCLOSURE

This disclosure relates generally to passive optical networks, and, more particularly, to systems and methods for detecting an anomaly in a passive optical network (PON) by separately analyzing data for multiple levels in a topology of components in the PON and combining the results of the level-specific analyses.

BACKGROUND

A conventional PON includes one or more optical line terminals (OLTs) at a central location connecting to one or more optical last mile termination units (LMTUs) disposed at respective customer premises (e.g., physical locations serviced by the PON) via one or more optical fibers. A PON is typically implemented using a point-to-multipoint topology in which a feeder optical fiber from an OLT serves multiple last mile termination units. An LMTU may be, for example, an optical network terminal (ONT) or an optical network unit (ONU) that is optically connected to the OLT via a respective distribution optical fiber received at the LMTU. Typically, the distribution optical fibers for respective ones of the LMTUs are optically coupled to the feeder optical fiber via a fiber distribution hub (FDH) using an optical splitter. A fiber distribution terminal (FDT) may be utilized to connect feeder optical fibers to distribution optical fibers, for example.

Typically, the effects of anomalies within the PON (e.g., equipment malfunctions, signal loss, network congestion, broken optical fibers, or other technical issues) are observed by customers or end-users at locations at which last mile termination units are disposed. For example, a customer may observe a slowing down or lack of fidelity of PON services at his or her location, and may contact the PON service provider for assistance. However, the customer may have to wait a long time before the problem is diagnosed and properly addressed.

Typically, problems within the PON are not addressed until a customer contacts the PON service provider, and the PON service provider has to react to the problem identified by the customer. This can lead to unnecessary repair visits or longer repair times. Additionally, problems are commonly misdiagnosed. For example, in-home Wi-Fi interference can be misinterpreted as a fiber problem or a customer may explain that they are having issues with their Wi-Fi network when the actual root cause is an issue with an upstream component of the PON.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

To proactively detect anomalies in the PON before customers notify the service provider of network issues, a multi-tier anomaly detection system continuously evaluates the health of the fiber access path from the OLT down to an in-home wireless network component (e.g., a Wi-Fi router).

The multi-tier anomaly detection system may detect anomalies using a topology by categorizing components of the PON into levels (e.g., an OLT level corresponding to the OLT, an FDH level corresponding to FDH(s) optically coupled to the OLT, an ONT level corresponding to ONT(s) for customer(s) optically coupled to the FDH, a local area network (LAN) level corresponding to wireless network component(s) that communicate with the ONT(s) for the customer(s), etc.). The multi-tier anomaly detection system may then produce a prioritized list of customers and components of the PON requiring maintenance.

More specifically, the multi-tier anomaly detection system obtains data for each of the levels (e.g., telemetry data). Then the multi-tier anomaly detection system applies the data specific to a particular level to a machine learning model (e.g., an isolation forest model) to generate a level-specific anomaly score for the level. The multi-tier anomaly detection system then detects anomalies for particular customers or for particular components by combining the level-specific anomaly scores.

For example, for the OLT level, the multi-tier anomaly detection system may obtain an optical transmit power from the OLT and/or an optical receive power at the OLT. These power levels may be specific to particular ONTs or particular optical ports. Additionally, the multi-tier anomaly detection system may obtain attenuation levels based on a difference between the OLT transmit power and the ONT receive power. Still further, the multi-tier anomaly detection system may obtain a bit-error rate, PON alarm counts and/or durations (e.g., a loss of signal (LOS) alarm, a dying gasp alarm, a Multimedia over Coax Alliance (MoCA) Loss of Link (MOCALOL) alarm, a local area network loss of signal (LANLOS) alarm), etc.

For the FDH level, the multi-tier anomaly detection system may obtain virtual optical averages computed for ONTs optically coupled to the FDH. The multi-tier anomaly detection system may also obtain alarm counts and/or durations for the ONTs optically coupled to the FDH.

For the ONT level, the multi-tier anomaly detection system may obtain an optical transmit power from the ONT, an optical receive power at the ONT, an estimated distance to the OLT, a deviation of the ONT power from the average power level in the PON or average power level of ONTs optically coupled to the same FDH, an optical power differential between the optical receive power at the OLT and the optical receive power at the ONT, local alarm counts and/or durations for the ONT, etc.

For the LAN level, the multi-tier anomaly detection system may obtain a received signal strength at the wireless network component, system events at the wireless network component (e.g., reboots, crashes, firmware resets), a packet error rate at the wireless network component, processor utilization metrics at the wireless network component, memory utilization metrics at the wireless network component, latency metrics at the wireless network component, etc.

In any event, for each level, the multi-tier anomaly detection system generates feature vectors over a moving time window using the data specific to the level. For example, the feature vectors may include moving averages, variances, percentiles, or drift for the parameters specific to the level. The feature vectors may be determined over multiple time windows, such as 2-day, 5-day, 10-day, and/or 30-day time windows. In an example scenario, for the ONT level, the multi-tier anomaly detection system may generate feature vectors by calculating moving average optical transmit power levels from the ONT over 2-day and 5-day time windows, calculating variances in the deviation of the ONT power from the average power level in the PON over the 2-day and 5-day windows, and calculating drift in the optical power differential over the 2-day and 5-day time windows.

The multi-tier anomaly detection system may apply the current feature vectors for a level to a machine learning model (e.g., an isolation forest model) to generate a level-specific anomaly score for the level. The machine learning model may be an unsupervised machine learning model trained using historical feature vectors generated from historical data associated with the level during non-anomalous or healthy periods. In this manner, the machine learning model obtains examples of historical feature vectors generated during non-anomalous periods. Then the machine learning model compares the current feature vectors to the historical feature vectors to generate the level-specific anomaly score based on an extent to which the current feature vectors deviate from the historical feature vectors. For example, if the generated feature vectors applied to the machine learning model deviate from the historical feature vectors generated during non-anomalous periods, the machine learning model may generate a high level-specific anomaly score indicating the feature vectors are generated during an anomalous period. On the other hand, if the generated feature vectors applied to the machine learning model are similar to the historical feature vectors generated during non-anomalous periods, the machine learning model may generate a low level-specific anomaly score indicating the feature vectors are generated during a non-anomalous period.

The multi-tier anomaly detection system repeats this process for each level in the topology to generate level-specific anomaly scores for each of the levels. Additionally, the multi-tier anomaly detection system normalizes the level-specific anomaly scores for each of the levels so they are on the same scale at each level (e.g., from 0 to 1).

In some implementations, the multi-tier anomaly detection system applies a statistical post-processing framework to the normalized level-specific anomaly scores using an Excess-Mass-inspired Area Under the Curve (EM-AUC) metric to select an operating threshold for determining whether a normalized level-specific anomaly score indicates an anomaly. Then the multi-tier anomaly detection system compares the normalized level-specific anomaly score for a level to the selected threshold and detects an anomaly when the normalized level-specific anomaly score exceeds the threshold. The selected threshold defines a boundary between score regions corresponding to typical behavior and anomalous behavior for the given level. The selected threshold may be different for each level according to an EM-AUC score calculated for each level.

More specifically, the multi-tier anomaly detection system may obtain normalized level-specific anomaly scores for a particular level based on sets of real network data. The multi-tier anomaly detection system may also generate synthetic uniform reference samples in engineered feature space (e.g., uniformly sampled feature vectors within a bounding region defined by historical feature minima/maxima) and apply them to the machine learning model to generate normalized level-specific anomaly scores for the synthetic uniform reference samples. Then for a given threshold, u, the multi-tier anomaly detection system estimates probabilities that the sets of real network data and the sets of synthetic uniform reference samples are below the threshold. The multi-tier anomaly detection system may then select an operating threshold, u, based on regions where the Excess-Mass-inspired functional indicates strong separation between the real-data score distribution and the uniform reference score distribution. In this manner, the present embodiments avoid trivial thresholds determined based on heuristics and provide an objective way to compare the outputs of machine learning models specific to each level.

In addition to detecting anomalies at each level, the multi-tier anomaly detection system may classify the severity of the anomalies. For example, the multi-tier anomaly detection system may classify anomalies as: severe (performance-impacting), moderate (chronic), or benign (non-impacting). To classify the severity of the anomalies, the multi-tier anomaly detection system applies the current feature vectors for a level detected as anomalous to a machine learning model (e.g., a random forest model) to generate a severity classification for the level. The machine learning model may be a supervised machine learning model trained using historical feature vectors generated from historical data associated with the level during anomalous periods for example, according to level-specific anomaly scores and/or selected EM thresholds. The machine learning model is also trained using labels indicating whether the anomalous periods were severe, moderate, or benign based on one or more operational ground-truth sources, such as outage logs, trouble tickets, technician dispatch outcomes, and/or key performance indicator (KPI) degradation, and in some cases customer contacts or complaints. For example: (i) overlap with a confirmed outage, repeated tickets, or material KPI degradation may be labeled 'severe'; (ii) partial KPI degradation or intermittent evidence may be labeled 'moderate/chronic'; and (iii) absence of tickets and absence of KPI degradation over a guardrail period may be labeled 'benign/non-impacting.' The machine learning model compares the current feature vectors and the level-specific anomaly score(s) to the labeled data to generate probabilities that the anomaly is severe, moderate, or benign. Then the multi-tier anomaly detection system may determine the severity classification for the anomaly having the highest probability or having a probability above a probability threshold. In some implementations, the severity classification is augmented by statistical decision rules (e.g., minimum persistence duration, recurrence thresholds, and cross-metric consistency checks across optical, alarm, and session metrics) to reduce transient or non-impacting events.

The multi-tier anomaly detection system then combines the level-specific anomaly detections and/or severity classifications to detect an anomaly for the customer or detect an anomaly for a particular component in the PON. More specifically, the multi-tier anomaly detection system may use semi-supervised machine learning by constructing a graph where nodes represent components of the PON and edges represent optical connections between the nodes according to the PON topology (e.g., RG↔ONT↔FDH↔OLT). At each node, the multi-tier anomaly detection system includes the number of anomalies, severity of the anomalies, and/or a duration of the anomalies.

The multi-tier anomaly detection system then initially labels some of the nodes as problematic having repeated customer complaints or outages, and initially labels some nodes as healthy that experienced long-term stability without complaints or outages. For the remaining nodes which are unlabeled, the multi-tier anomaly detection system propagates labels from the labeled nodes based on similarity in the number of anomalies, severity of the anomalies, and/or a duration of the anomalies to the labeled nodes. The multi-tier anomaly detection system may also propagate labels based on connectivity. For example, if an FDH is optically coupled to 10 ONTs, all of which are labeled as problematic, the multi-tier anomaly detection system may label the FDH as problematic.

In any event, the multi-tier anomaly detection system uses the initial labels and propagated labels for the nodes to generate an anomaly detection for a particular customer or for a particular component of the PON. For example, the multi-tier anomaly detection system may generate a probability of an acute issue for a customer and/or a probability of a chronic issue for the customer. The multi-tier anomaly detection system may also generate a probability of an acute issue for a component and/or a probability of a chronic issue for the component. Additionally, the multi-tier anomaly detection system may identify a suggested root cause level responsible for the anomaly based on the initial and propagated labels for the nodes in the topology. For example, if an FDH is labeled as problematic and each of the ONTs optically coupled to the FDH are labeled as problematic, the multi-tier anomaly detection system may determine the root cause level is the FDH level.

Then the multi-tier anomaly detection system may provide the results of the anomaly detection for display. For example, the multi-tier anomaly detection system may generate a ranked list of customers to investigate and/or components of the PON to proactively repair based on the severity and/or type of anomalies, the acute and/or chronic probabilities of an anomaly, the number of impacted customers under a shared component, etc. The multi-tier anomaly detection system may provide the ranked list to service repair technician client devices for the service repair technicians to view the ranked list and begin the repairs.

By analyzing data and generating feature vectors specific to levels within a PON topology, anomalies can be detected with precision. This approach leverages the inherent sensitivity of optical signals to changes in the network environment, making it possible to identify irregularities that may go unnoticed. By continuously monitoring and analyzing light level signals and other telemetry data, the multi-tier anomaly detection system can proactively respond to potential malfunctions and ensure the integrity and reliability of the network infrastructure. This ultimately enhances the overall network performance for customers.

In an embodiment, a method for detecting an anomaly in a Passive Optical Network (PON) includes obtaining data for a customer in a PON associated with a plurality of levels in a topology. The PON includes an optical line terminal (OLT) optically connected to a plurality of optical network terminals (ONTs) via a plurality of optical fibers. The plurality of levels include two or more of: a local area network level corresponding to a wireless network component that communicates with an ONT for the customer, an ONT level corresponding to the ONT for the customer, a fiber distribution hub (FDH) level corresponding to an FDH optically connected to the customer ONT, or an OLT level corresponding to the OLT optically connected to the FDH which is optically connected to the customer ONT. For each of the plurality of levels, the method includes analyzing a subset of the data corresponding to the level to generate a level-specific anomaly metric. Additionally, the method includes combining the level-specific anomaly metrics to detect an anomaly associated with the customer and providing an indication of the anomaly to at least one of a user interface or another computing device.

In another embodiment, a computing device for detecting an anomaly in a Passive Optical Network (PON) includes one or more processors, and a non-transitory computer-readable memory storing instructions thereon. When executed by the one or more processors, the instructions cause the computing device to obtain data for a customer in a PON associated with a plurality of levels in a topology. The PON includes an optical line terminal (OLT) optically connected to a plurality of optical network terminals (ONTs) via a plurality of optical fibers. The plurality of levels include two or more of: a local area network level corresponding to a wireless network component that communicates with an ONT for the customer, an ONT level corresponding to the ONT for the customer, a fiber distribution hub (FDH) level corresponding to an FDH optically connected to the customer ONT, or an OLT level corresponding to the OLT optically connected to the FDH which is optically connected to the customer ONT. For each of the plurality of levels, the instructions cause the computing device to analyze a subset of the data corresponding to the level to generate a level-specific anomaly metric. Additionally, the instructions cause the computing device to combine the level-specific anomaly metrics to detect an anomaly associated with the customer and provide an indication of the anomaly to at least one of a user interface or another computing device

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate examples of concepts that include the claimed invention, and explain various principles and advantages of those examples.

Figure 1:
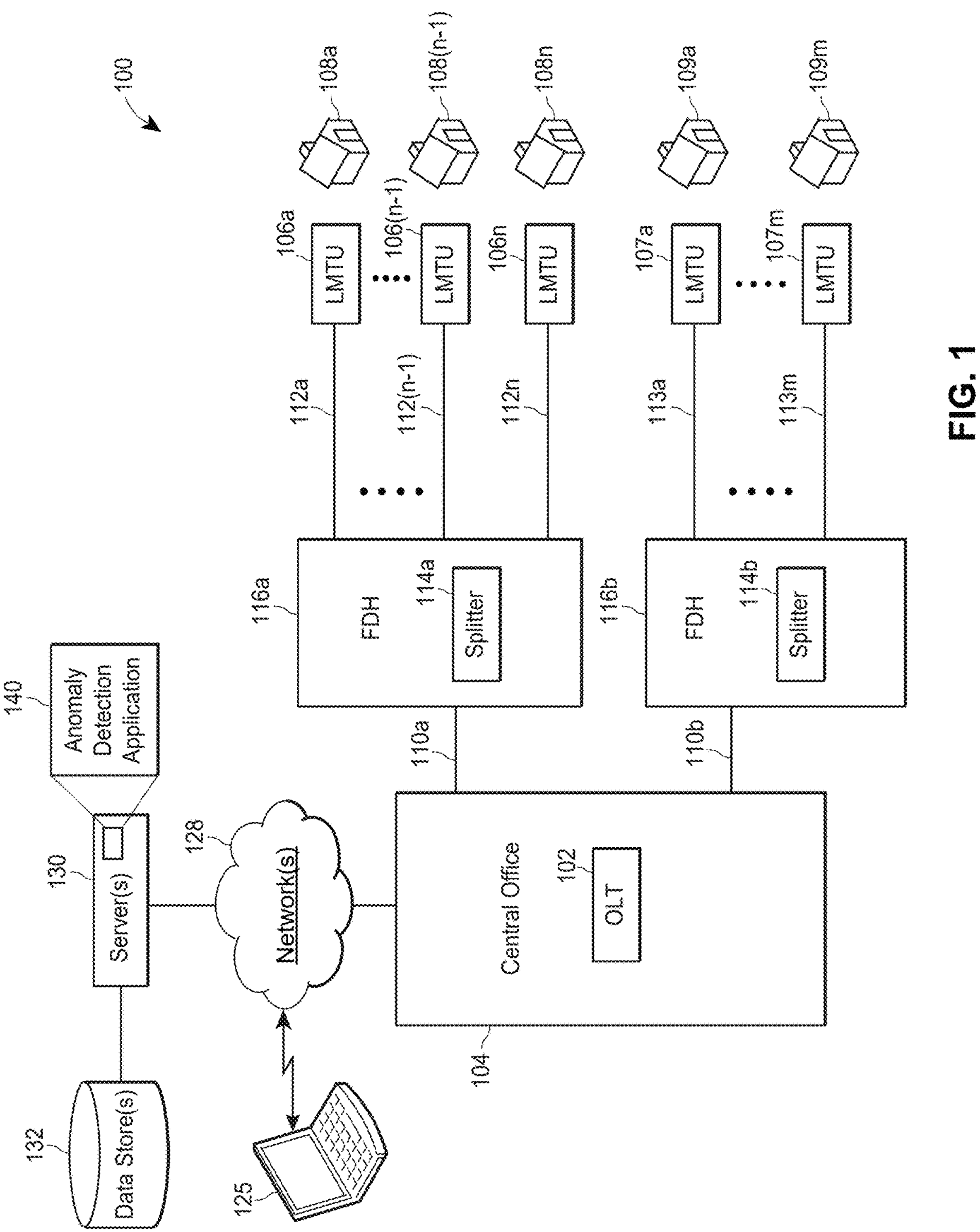
FIG. 1 is a block diagram of an example passive optical network (PON) in which the systems, methods, and/or techniques of the present disclosure may be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the present disclosure.

The apparatus and method components have been represented where appropriate by conventional symbols in the drawings, showing only those specific details that are pertinent to understanding examples of the present disclosure so as not to obscure the disclosure with details that will be readily apparent to those of ordinary skill in the art having the benefit of the description herein.

Although the figures show parts with clean lines and boundaries, some or all of these lines and/or boundaries may be idealized. In reality, the boundaries and/or lines may be unobservable, blended, and/or irregular. Use of terms such as up, down, top, bottom, side, end, front, back, etc. herein are used with reference to a currently considered or illustrated orientation. If they are considered with respect to another orientation, it should be understood that such terms must be correspondingly modified.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

Example Passive Optical Network (PON)

FIG. 1 is a block diagram of an example PON 100 in which the systems, methods, and techniques of the present disclosure may be implemented. The example PON 100 includes one or more optical line terminals (OLTs) (an example one of which is designated by reference numeral 102) at a central location (e.g., at a central office 104) optically connecting to one or more last mile termination units 106*a*, . . . , 106*n* at respective customer premises 108*a*, . . . , 108*n*. The last mile termination units 106*a*, . . . , 106*n* may be located outside and/or inside the customer premises or locations 108*a*, . . . , 108*n*. Each last mile termination unit 106*a*, . . . , 106*n* may be, for example, an optical network unit (ONU) or an optical network terminal (ONT). In some examples herein, the term "optical terminal" generally refers to a last mile termination unit (e.g., an ONU or ONT) or an OLT.

The example PON 100 is implemented using instances of point-to-multipoint topology. For example, in the example PON 100, a first feeder optical fiber 110*a* from the OLT 102 (which is interchangeably referred to herein as an "F1 optical fiber 110*a*" or a "primary optical fiber 110*a*") serves the one or more last mile termination units 106*a*, . . . , 106*n* via respective distribution optical fibers 112*a*, . . . , 112*n* (which are interchangeably referred to herein as "F2 optical fibers 112*a*, . . . , 112*n*" or "secondary optical fibers 112*a*, . . . , 112*n*"). In the illustrated example, the first feeder optical fiber 110*a* is optically coupled to the plurality of last mile termination units 106*a*, . . . , 106*n* via an example one-to-many optical splitter 114*a* which is disposed, located, implemented, etc. in an example fiber distribution hub (FDH) 116*a*. In some arrangements, the FDH 116*a* is located within a geographic area (e.g., a neighborhood) such that the customer premises 108*a*, . . . , 108*n* are proximally close to the FDH 116*a*, and typically each of the customer premises 108*a*, . . . , 108*n* and respective last mile termination units 106*a*, . . . , 106*n* is disposed at a different optical distance from the FDH 116*a*. An "optical distance," as generally utilized herein, refers to a distance over which an optical signal travels.

In embodiments, the PON 100 may or may not include additional feeder optical fibers and optical splitters for a plurality of additional customer premises. Moreover, a PON may or may not include a plurality of FDHs. For example, as shown in FIG. 1, the example PON 100 includes a second feeder or primary optical fiber 110*b* from the OLT 102 that is optically coupled to another plurality of last mile termination units 107*a*-107*m* at respective customer premises 109*a*-109*m* via another one-to-many optical splitter 114*b* included in another fiber distribution hub 116*b* and via respective secondary optical fibers 113*a*-113*m*.

As utilized herein, the "components" of the PON 100 generally refer to the devices, nodes, and optical fibers of the PON 100. For example, the components of the PON 100 shown in FIG. 1 may include the OLT 102, the FDHs 116*a*, 116*b*, the splitters 114*a*, 114*b*, the LMTUs 106*a*-106*n* and 107*a*-107*m*, and the optical fibers interconnecting the devices or nodes, e.g., the optical fibers 110*a*-110*b*, 112*a*-112*n*, and 113*a*-113*m*.

In some scenarios, an optical terminal (e.g., the OLT 102 and/or one or more the last mile termination units 106*a*-106*n*, 107*a*-107*m*) may transmit optical test signals and/or patterns, indication light, and/or other types of measurement signals into an optical fiber in response to control signals received from a computing device. For example, the OLT 102 and/or the one or more LMTUs 106*a*-106*n*, 107*a*-107*m* may receive control signals from a computing device 125 (e.g., a laptop, a computer, a tablet, a mobile phone, etc.) associated with a service technician or other agent of the PON 100. In some examples, the computing device 125 controls an optical terminal of the PON 100 via one or more networks 128 (which may include one or more wired and/or wireless private networks and/or public networks, such as the Internet), and/or by direct interaction with the optical terminal (e.g., via a hotspot provided by the optical terminal, a service port of the optical terminal, etc., not shown in FIG. 1). Additionally and/or alternatively, control signals may be received from one or more servers 130 of the PON 100 that are used to manage the PON 100, the network(s) 128, etc. For example, the one or more servers 130 may schedule and execute diagnostics of various components of the PON 100 and/or of the PON 100 as a whole, generate alerts and alarms, initiate various actions, provide user interfaces, which may include graphical user interfaces (e.g., at the computing device 125), log, historize, and/or otherwise store data generated by and associated with the PON 100 (e.g., in one or more data stores 132), and the like. For example, one or more applications may execute at the server(s) 130 and/or the server(s) may host one or more services to provide management, administrative, and/or test functionalities of the PON 100.

More specifically, the server 130 may execute an anomaly detection application 140 to detect anomalies in the PON 100 by analyzing telemetry data collected at multiple levels within a PON topology. The components of the PON 100 may include optical detectors to detect light level signals at upstream or downstream endpoints of the optical fibers 110*a*-110*b*, 112*a*-112*n*, and 113*a*-113*m*. For example, an LMTU 106*a* may include an optical detector to detect the light levels of optical signals at a downstream endpoint of the optical fiber 112*a*. FDH-level conditions are inferred using correlated telemetry from optical terminals (e.g., OLT/ONT optics and alarms) for ONTs sharing the same splitter/FDH. In some implementations, the multi-tier anomaly detection system computes virtual FDH metrics (e.g., a virtual optical signal average) from OLT/ONT readings to monitor passive outside-plant segments (e.g., FDHs/splitters) that do not include powered measurement devices. As utilized herein, the term "upstream" refers to a direction towards the central office 104, and the term "downstream" refers to a direction away from the central office 104.

In any event, the server 130 receives the light level signals from the optical detectors and other telemetry data and analyzes the telemetry data to detect anomalies in the PON 100. When the server 130 detects an anomaly, the server 130 may present an indication of the anomaly on a user interface, or provide the indication of the anomaly to a computing device 125 to present the indication of the anomaly. Additionally, the server 130 may determine a root cause of the anomaly and present an indication of the root cause on a user interface, or provide the indication of the root cause to a computing device 125 to present the indication of the root cause. In this manner, a service technician or other agent of the PON 100 may see the indication of the anomaly and/or the root cause and proactively address the issue to reduce downtime and enhance network performance.

The anomaly detection application 140 may execute in whole or in part on the server 130 or the computing device 125. In some implementations, some portions of the anomaly detection application 140 may execute on the server 130 while other portions execute on the computing device 125. In other implementations, the anomaly detection application 140 executes entirely on the server 130 or entirely on the computing device 125.

In some implementations, when an anomaly is detected, the server 130 or the computing device 125 may transmit a control signal to a component of the PON 100 (e.g., an LMTU 106*a*, an FDH 116*a*, etc.) to for example, automatically reboot or reset the component of the PON 100. In some implementations, the server 130 or computing device 125 may optionally transmit a control signal to reboot, reset, or perform a diagnostic action for a component (e.g., to reset a light source within a component that emits optical signals) when supported by device capability, provisioning interfaces, and operator policy/authorization. In this manner, the PON 100 may automatically respond to a malfunction without human intervention.

Various information and data associated with, utilized by, and/or generated by the PON 100 may be stored in the data stores 132 of the PON 100. For example, the data store(s) 132 may store machine learning models, such as isolation forests or random forests for multiple levels of the topology. The data store(s) 132 may also store records of customer contact events with a technical support organization supporting the PON 100, service call records, records of operating conditions and events which occurred, logbooks, and the like. Additionally, the data store(s) 132 may store applications which may execute at the one or more servers 130, and/or which may be downloaded or otherwise provided to the technician computing device 125 for installation and execution thereon. Further, the data store(s) 132 may store data indicative of performance, faults, diagnostics, statuses, states, and/or other data corresponding to the components of the system 100. Still further, the data store(s) 132 may store data indicative of the architecture, infrastructure, and component connectivity of the PON 100, including identifications of various PON components and indications of which PON components connect to which other PON components. The data store(s) 132 may also store any updates to any and all of the information and data stored therein.

The example servers 130, optical terminals (e.g., any of the OLT 102, the last mile termination units 106*a*, 106*n*), and/or the example computing system 125 may include a processing platform capable of executing instructions to, for example, implement operations of the example methods described herein, as may be represented by the flowcharts of the drawings that accompany this description. Other example logic circuits capable of, for example, implementing operations of the example methods described herein include a field programmable gate array (FPGA), an application specific integrated circuit (ASIC), a programmable logic device (PLD), and a field programmable logic device (FPLD). The processing platform may be, for example, one or more servers, a cloud computing system, a computer, a workstation, a laptop, a mobile device (e.g., a cell phone, a smart phone, a tablet such as an IPAD™), or any other type of computing device or system.

The example processing platform includes one or more processors, one or more memories, one or more network interfaces, one or more input/output (I/O) interfaces, and/or a set of data stores, all of which are interconnected via one or more address/data bus or communication links.

The processors may be implemented using hardware, and may include a semiconductor based (e.g., silicon-based) device. The processors may be, for example, one or more programmable microprocessors, controllers, digital signal processors (DSP), graphics processing units (GPU) and/or any suitable type of programmable processor capable of executing instructions to, for example, implement operations of the example methods described herein. Additionally and/or alternatively, the processors may be a field programmable gate array (FPGA), an application specific integrated circuit (ASIC), etc. that implements operations of the example methods described herein without executing instructions.

The memories are accessible by the processors (e.g., via a memory controller). The example processors interact with the memories to obtain, for example, machine-readable instructions stored in the memories corresponding to, for example, the operations represented by the flowcharts of this disclosure. The example processors may also interact with the memories to store data, such as data formed or used during execution of machine-readable instructions. Example memories include any number and/or type(s) of volatile or non-volatile, non-transitory, machine-readable storage medium, devices or disks, such as a semiconductor memory, magnetically readable memory, optically readable memory, biologically readable memory, a hard disk drive (HDD), a solid-state drive (SSD), a read-only memory (ROM), a random-access memory (RAM), a redundant array of independent disks (RAID) system, a cache, flash memory, or any other storage medium, device or disk in which information may be stored for any duration (e.g., permanently, for an extended time period, for a brief instance, for temporarily buffering, for caching of the information, etc.). Additionally and/or alternatively, machine-readable instructions corresponding to the example operations described herein may be stored on one or more volatile or non-volatile, non-transitory, machine-readable removable storage media (e.g., a compact disc (CD), digital versatile disk (DVD), Blu-ray disk, removable flash memory, etc.) that may be coupled to the processing platform to provide access to the machine-readable instructions stored thereon.

The example processing platform includes one or more communication interfaces such as, for example, the one or more network interfaces, and/or the one or more input/output (I/O) interfaces. The communication interface(s) enable the processing platform to communicate with, for example, another device, system, etc. (e.g., the OLT 102, the last mile termination units **106*a*, 106*n*, the one or more servers 130, the computing device 125, the one or more data stores 132**, etc., any other database, and/or any other machine).

The example processing platform includes the network interface(s) to enable communication with other machines (e.g., the OLT 102, the last mile termination units **106*a*, 106*n*, the one or more servers 130, the computing device 125, etc.) via, for example, one or more networks such as the PON 100 and/or the network(s) 128**. The example network interfaces include any suitable type of communication interface(s) (e.g., wired and/or wireless interfaces) configured to operate in accordance with any suitable communication protocol(s). Example network interfaces include a TCP/IP interface, a WiFi™ transceiver (e.g., according to the IEEE 802.11x family of standards), an Ethernet transceiver, a cellular transceiver, a satellite transceiver, an asynchronous transfer mode (ATM) transceiver, a digital subscriber line (DSL) modem, a coaxial cable modem, a dialup modem, or any other suitable interface based on any other suitable communication protocols or standards.

The example, processing platform includes the input/output (I/O) interface(s) (e.g., a Bluetooth® interface, a near-field communication (NFC) interface, a universal serial bus (USB) interface, a serial interface, an infrared interface, a PCI express interface, etc.) to enable the processors to communicate with peripheral I/O devices and/or other communication systems. For example, the I/O interface(s) may be used to control a light source, enable receipt of user input (e.g., from a touch screen, a keyboard, a navigation device such as mouse, touch pad, joystick or trackball, a microphone, a button, etc.) and communicate output data (e.g., visual indicators, instructions, data, images, etc.) to the user (e.g., via a display, a speaker, a printer, a communication interface, an antenna, etc.). The I/O interface(s) typically include a graphics driver card, graphics driver chip and/or graphics driver processor to drive a display when a display is present.

In some examples, the processing platform also includes, or is otherwise communicatively coupled to, a set of data stores or other data storage mechanisms (one or more of a HDD, optical storage drive, solid state storage device, CD, CD-ROM, DVD, Blu-ray disk, RAID, data storage bank, etc.). The set of data stores may include the example data stores 132.

Figure 2:
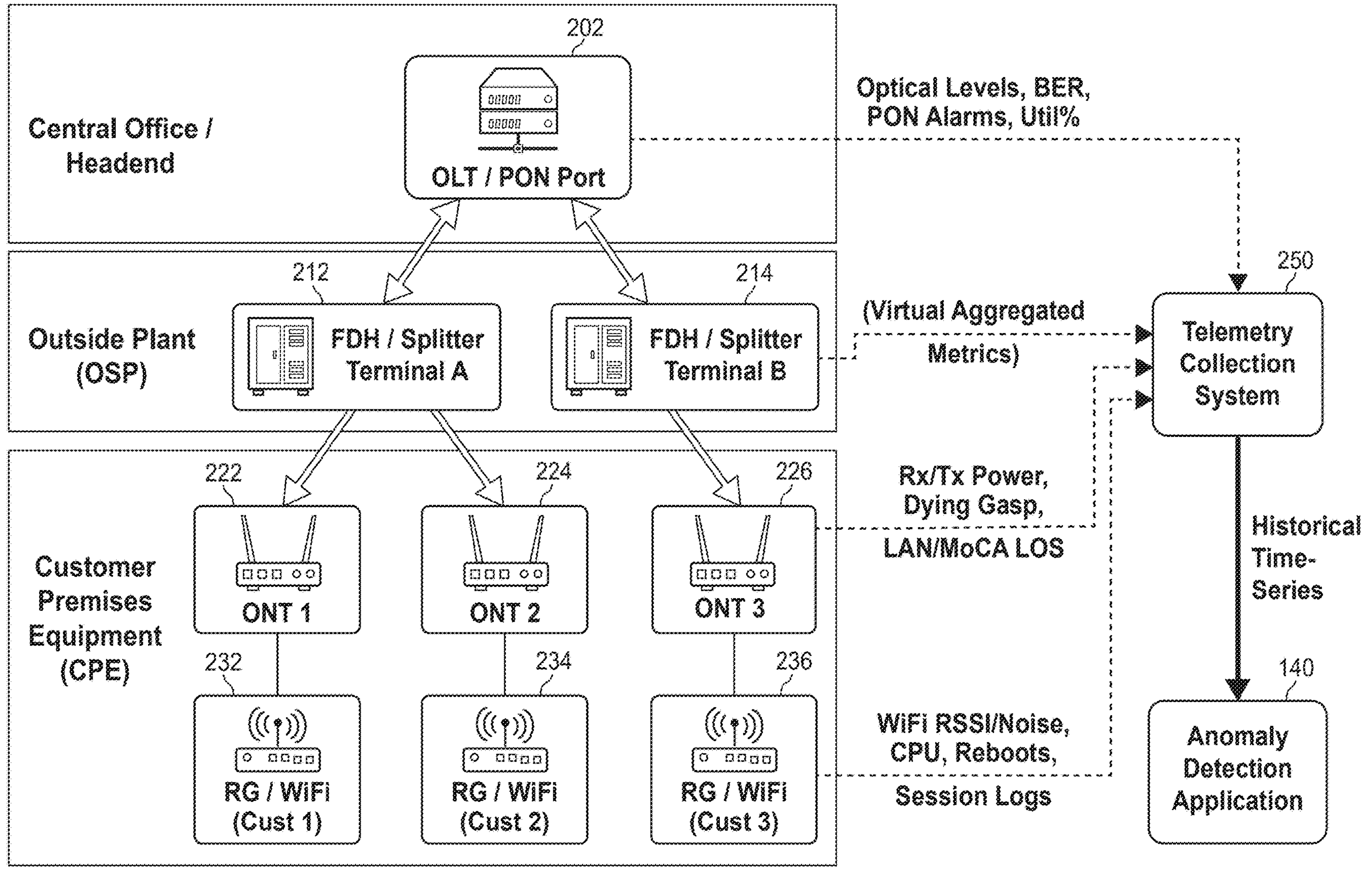
FIG. 2 illustrates a network topology depicting a hierarchical structure of a PON having components categorized into different levels, where telemetry data is collected at each level, according aspects of the present disclosure.

Referring to FIG. 2, a network topology depicts a hierarchical structure of a PON 100 having components categorized into different levels, where telemetry data is collected at each level by a telemetry collection system 250 and the anomaly detection application 140. The network topology is organized into physical location layers (e.g., central office/headend, outside plant, and customer premises equipment), within which the multi-tier anomaly detection system defines multiple topology levels (e.g., OLT level, FDH level, ONT level, and RG/LAN level).

At a top layer labeled as Central Office/Headend, an OLT 202 serves as a central component of the PON 100. The OLT 202 corresponds to the OLT level in the topology of the PON. A telemetry collection system 250, which may be included in the server 130 and/or as part of the anomaly detection application 140, may obtain telemetry data at the OLT level from the OLT 202 including optical transmit power levels and optical receive power levels at the OLT 202 and at ONTs optically coupled to the OLT 202, attenuation metrics from the OLT transmit power level to ONT receive power levels, bit error rates (BERs), PON alarms, utilization metrics, etc. The PON alarms may include LOS (loss of signal), Dying Gasp, MOCALOL (MoCA loss of link), INACT (inactive), LANLOS (LAN loss of signal), and SD (signal degrade) alarms with associated counts and durations.

With continued reference to FIG. 2, a middle layer labeled as Outside Plant (OSP) includes a first FDH/splitter terminal 212 and a second FDH/splitter terminal 214. The first FDH/splitter terminal 212 and the second FDH/splitter terminal 214 correspond to the FDH level in the topology. Both the first FDH/splitter terminal 212 and the second FDH/splitter terminal 214 are connected to the OLT 202 via optical fibers. The telemetry collection system 250 may obtain telemetry data at the FDH level from the first FDH/splitter terminal 212 and the second FDH/splitter terminal 214 including virtual aggregated metrics, such as a virtual optical average from ONTs under the FDH, or aggregated alarm metrics (e.g., alarm counts and durations) for the ONTs under the FDH. The aggregated alarm metrics may be categorized by type (e.g., alarm counts and durations for MoCA Loss alarms, alarm counts and durations for LAN Loss alarms, etc.). The virtual optical averages may be computed from ONT and OLT optical power levels for all ONTs under the same splitter or FDH. The metrics at the FDH level are virtual/derived metrics computed from measurements at optically coupled endpoints (e.g., OLT/ONT) and aggregated by splitter/FDH grouping, rather than measured at the passive FDH itself.

A bottom layer labeled as Customer Premises Equipment (CPE) includes a first ONT 222, a second ONT 224, and a third ONT 226. The first ONT 222, the second ONT 224, and the third ONT 226 correspond to the ONT level in the topology. The first ONT 222 and the second ONT 224 are connected to the first FDH/splitter terminal 212, while the third ONT 226 is connected to the second FDH/splitter terminal 214. The telemetry collection system 250 may obtain telemetry data at the ONT level from the ONTs 222-226 including optical receive/transmit power levels to and from the ONTs 222-226, estimated distances to the OLT 202, deviations of optical power from the FDHs 212, 214 compared to the ONTs 222-226, differentials from the received optical power levels at the ONTs 222-226 to the received optical power levels at the OLT 202, local alarms at the ONTs 222-226, such as LOS, Dying Gasp, MOCALOL, INACT, LANLOS, and SD alarms with associated counts and durations, etc.

As further shown in FIG. 2, each ONT 222-226 is associated with a corresponding residential gateway 232-236. A residential gateway 232-236 may be a router, a modem, a combination router and modem, etc. that enables a customer to connect to the Internet via the PON 100. A first residential gateway 232 is connected to the first ONT 222, a second residential gateway 234 is connected to the second ONT 224, and a third residential gateway 236 is connected to the third ONT 226. The first residential gateway 232, the second residential gateway 234, and the third residential gateway 236 are examples of wireless network components which correspond to the local area network level in the topology.

The telemetry collection system 250 may obtain telemetry data at the local area network level from the first residential gateway 232, the second residential gateway 234, and the third residential gateway 236 including received signal strengths at the wireless network components 232-236 (e.g., WiFi RSSI), noise floor levels at the wireless network components 232-236, channel utilization metrics at the wireless network components 232-236, retry rates at the wireless network components 232-236, system events at the wireless network components 232-236 (e.g., reboot events, crash events, firmware resets), packet drop/error rates at the wireless network components 232-236, processor utilization metrics at the wireless network components 232-236, memory utilization metrics at the wireless network components 232-236, latency metrics at the wireless network components 232-236, queue occupancy metrics at the wireless network components 232-236, session logs, etc. The WiFI RSSI may be categorized by band.

The telemetry data may also include session and Remote Authentication Dial-In User Service (RADIUS) data including session down times per event, total session stop counts per subscriber per window, stop causes including Lost Carrier, NAS Request, User Request, Idle Timeout, Administrative Reset, port error, etc.

The telemetry collection system 250 aggregates data for each of the different levels and stores historical time-series data. The anomaly detection application 140 obtains the telemetry data from the telemetry collection system 250 for processing and analysis. This topology-aligned data collection enables the anomaly detection application 140 to perform hierarchical anomaly detection across the different levels of the network topology.

The anomaly detection application 140 may then analyze the telemetry data at each level to generate feature vectors which may be rolling statistics per time window including 2-day, 5-day, 10-day, and 30-day windows.

The rolling statistics may include mean, standard deviation, variance, maximum, and minimum values over the time window for the parameters within the telemetry data as described above such as optical receive and transmit power levels, attenuation metrics, BERs, alarm counts and durations, etc. For the same parameter (e.g., optical receive power at the OLT), the anomaly detection application 140 may generate rolling statistics over multiple time windows (e.g., 2-day and 30-day windows) to identify acute and chronic issues.

The anomaly detection application 140 may also compute percentiles for the parameters as feature vectors, such as the $5^{th}$ percentile (p5), $50^{th}$ percentile (p50), $75^{th}$ percentile (p75), and/or $95^{th}$ percentile (p95) values for a parameter over the time window. Also in some implementations, the anomaly detection application 140 may compute additional feature vectors such as z-scores for the parameters relative to long-term baselines and/or drift slopes for the parameters representing daily or weekly change for the parameters.

In some implementations, the anomaly detection application 140 may normalize the feature vectors, for example using peer-based normalization techniques. The feature vectors for a level may be normalized relative to peer components associated with the level. For example, an optical receive power level for an ONT may be normalized relative to the average receive power level for ONTs optically coupled to the same FDH as the ONT or the average receive power level for ONTs optically coupled to the same OLT as the ONT. In another example, a WiFi congestion level (e.g., a queue occupancy metric) for an RG may be normalized relative to other RGs coupled to the same OLT or within the same region.

Still further, the feature vectors may include multi-window composites such as ratios or differences between short-term (e.g., 2-day) and long-term (e.g., 30-day) time windows for a parameter to distinguish acute spikes from chronic patterns. For example, at the ONT level, a feature vector may include a ratio between the mean optical transmit power level from the ONT over a 2-day time window and the mean optical transmit power level from the ONT over a 30-day time window.

The feature vectors may also include event features such as alarm types, counts, and/or durations over the time window, system events over the time window, session stops over the time window, etc.

The anomaly detection application 140 may utilize a signature feature library that is grouped by level including the local area network (e.g., RG), ONT, FDH, and OLT levels and/or grouped by technology, such as GPON, XGS-PON, etc. The signature feature library may be versioned and extensible as new metrics and patterns become available.

Figure 3:
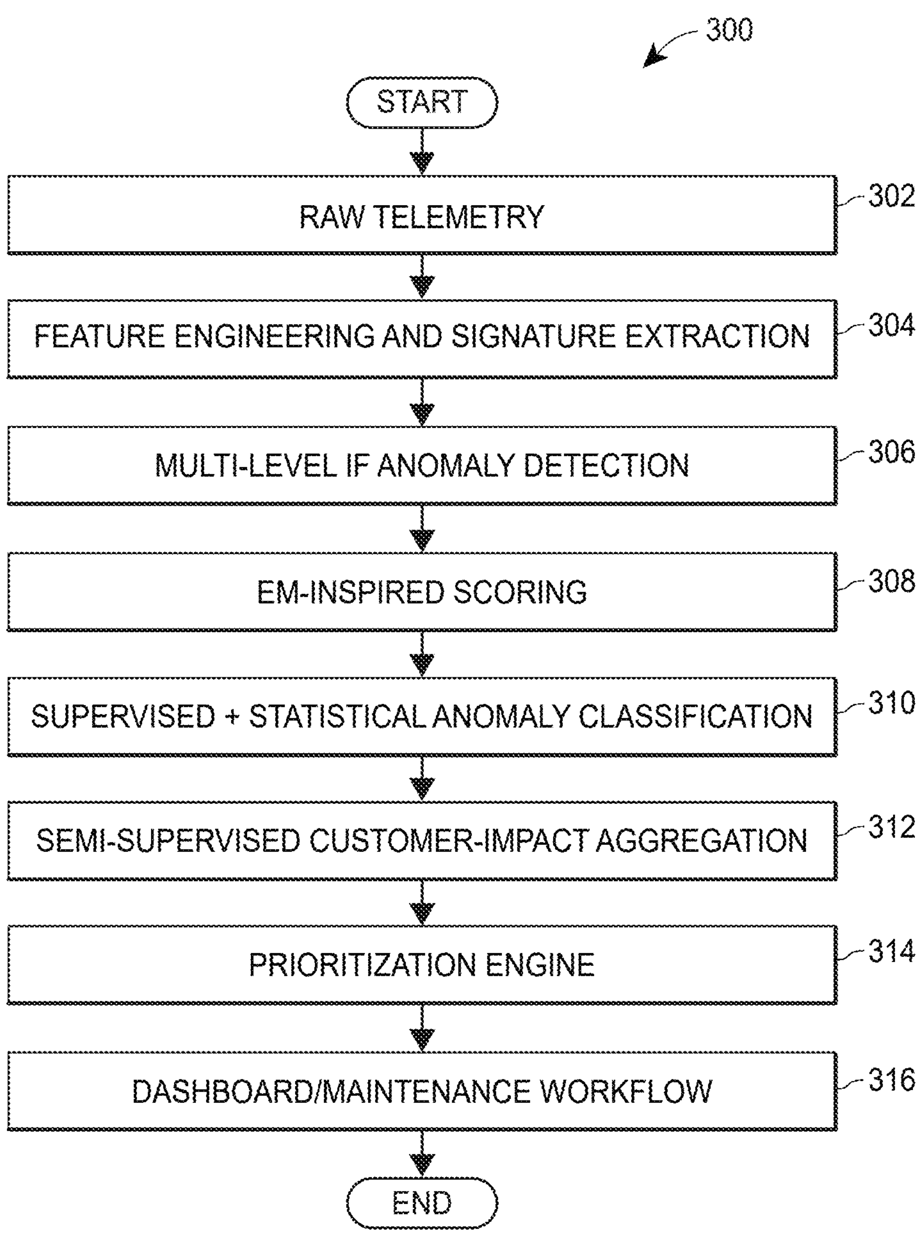
FIG. 3 is a flowchart of an example method for topology-aware hierarchical anomaly detection and prioritization in a PON, according to aspects of the present disclosure.

Referring to FIG. 3, a method 300 for topology-aware hierarchical anomaly detection and prioritization in a fiber access network is illustrated. The method 300 may be performed by the anomaly detection application 140 executing on the server 130 or the computing device 125. The method 300 begins with step 302, where raw telemetry data is collected from various components including OLTs, FDHs, ONTs, and RGs. The anomaly detection application 140 may categorize the raw telemetry data by level from the network topology (e.g., OLT level, ONT level, FDH level, local area network level).

Additionally, the anomaly detection application 140 may categorize the raw telemetry data by component, so that each component is evaluated to determine the likelihood and severity of an anomaly. Then the anomaly detection application 140 may utilize the topology to identify each of the components at the different levels which are optically coupled to a customer's wireless network component (e.g., RG). In this manner, the anomaly detection application 140 may generate level-specific anomaly metrics for each component to detect an anomaly for a customer and/or determine a root cause level of the anomaly (e.g., the ONT coupled to the customer's RG, the FDH optically coupled to the ONT which is coupled to the customer's RG, etc.).

The method 300 then proceeds to a step 304, where the anomaly detection application 140 performs feature engineering and signature extraction on the raw telemetry data. At each level/component, the anomaly detection application 140 generates feature vectors over a moving time window based on a subset of the telemetry data corresponding to the level. The feature vectors may include rolling statistics over one or more moving time windows for several parameters, such as a moving average, a variance, a maximum, a minimum, a percentile, a distribution metric (e.g., a z-score) or a drift. The rolling statistics may be normalized relative to peer components associated with the level. For example, an optical receive power level for an ONT may be normalized relative to the average receive power level for ONTs optically coupled to the same FDH as the ONT or the average receive power level for ONTs optically coupled to the same OLT as the ONT. The feature vectors may also include multi-window composite features including ratios and differences between short-term and long-term windows such as 2-day versus 30-day to distinguish acute spikes from chronic patterns. The anomaly detection application 140 may compute engineered feature vectors as daily or multi-day aggregates with rolling statistics and percentiles to reduce long-term storage requirements (e.g., in some evaluations, on the order of an 80-90% reduction compared to retaining high-frequency raw telemetry long-term).

The method 300 continues to a step 306, where multi-level isolation forest anomaly detection is performed. At the step 306, the anomaly detection application 140 may analyze a subset of the data corresponding to the level to generate a level-specific anomaly metric by providing the subset of the data to a machine learning model for the level to generate the level-specific anomaly metric. More specifically, the anomaly detection application 140 may apply the feature vectors for a particular level to the machine learning model for the level to generate the level-specific anomaly metric. The machine learning model for generating the level-specific anomaly metric may be an unsupervised machine learning model such as an isolation forest. In other implementations, the anomaly detection application 140 may utilize alternative anomaly-scoring models (e.g., one-class support vector machines (SVMs), autoencoders, or clustering-based outlier scoring), while preserving the topology-aligned multi-level pipeline described herein.

In any event, separate machine learning models may be trained at different topology levels using historical data corresponding to the level, such as historical feature vectors generated from historical data corresponding to the level during periods known to be predominantly healthy with large outages and maintenance windows excluded using alarm and/or ticket logs. In some implementations, separate machine learning models may be trained per technology, such as GPON or XGS-PON. Also in some implementations, the anomaly detection application 140 may use online learning for the machine learning models to adapt to new traffic patterns or hardware changes in the PON 100.

The machine learning model may generate a level-specific anomaly metric based on the current feature vectors for the level. The level-specific anomaly metric may be a score, for example from 0 to 1 where the score represents a likelihood of an anomaly, such that a score of 1 indicates a very high likelihood of an anomaly and a score of 0 indicates a very low likelihood of an anomaly. For example, when the machine learning model is an isolation forest, the isolation forest may compare the current feature vectors for the level to the historical feature vectors for the level during predominantly healthy periods to determine an extent to which the current feature vectors deviate from the historical feature vectors. If the current feature vectors deviate from the historical feature vectors (e.g., by more than a threshold amount), the machine learning model may generate a high level-specific anomaly score indicating the feature vectors are generated during an anomalous period. On the other hand, if the current feature vectors are similar to the historical feature vectors (e.g., the current feature vectors do not deviate from the historical feature vectors by more than a threshold amount), the machine learning model may generate a low level-specific anomaly score indicating the feature vectors are generated during a non-anomalous period.

Figure 4:
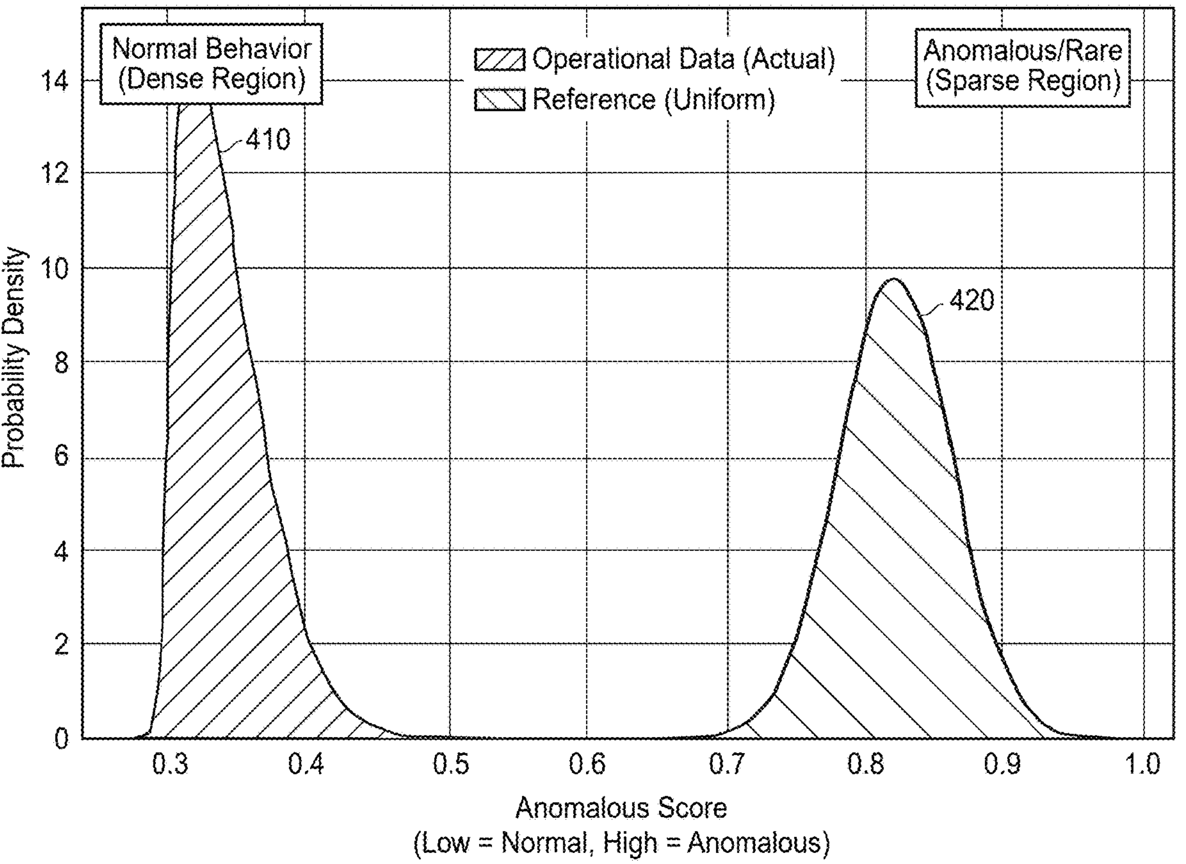
FIG. 4 depicts a graph illustrating probability density distributions of anomaly scores for operational data compared to reference scores indicative of anomalies, according to aspects of the present disclosure.

FIG. 4 illustrates an example comparison of the distributions of level-specific anomaly scores for operational data 410 compared to uniform reference scores 420. The operational data distribution 410 corresponds to Isolation Forest scores computed on real network data collected from the passive optical network 100, while the reference distribution 420 corresponds to Isolation Forest scores computed on synthetic uniform samples generated in feature space.

The operational data distribution 410 in one example is centered approximately at an anomaly score of 0.3 and represents normal behavior in a dense region. The operational data distribution 410 exhibits a sharp peak indicating that most operational data points cluster in the low anomaly score range. A reference distribution 420 in the same example is centered approximately at an anomaly score of 0.8, and represents anomalous or rare patterns in a sparse region. The reference distribution 420 represents uniform reference data and exhibits a lower peak.

The distinct separation between the operational data distribution 410 and the reference distribution 420 allows the isolation forest model to distinguish normal network conditions from anomalous or rare network patterns.

As further shown in FIG. 3, the method 300 then moves to a step 308, where EM-inspired scoring is applied to select a threshold for determining whether or not a level-specific anomaly score corresponds to an anomaly. Anomaly scores below the threshold are treated as likely normal, while anomaly scores above the threshold are treated as candidate anomalies for downstream classification and prioritization . . . . The anomaly detection application 140 compares the score distribution of real network data to scores on synthetic uniform samples in feature space (as shown in FIG. 4) using Laplace-smoothed probabilities to determine the threshold.

The anomaly detection application 140 may collect Isolation Forest scores, $S_{data}$, on real network data to generate the operational data distribution 410 as shown in FIG. 4. Additionally, the anomaly detection application 140 may generate synthetic uniform reference feature vectors as a reference baseline in engineered feature space, $S_{unif}$, and apply the synthetic uniform reference feature vectors to the same Isolation Forest model to generate Isolation Forest scores for the synthetic uniform reference feature vectors.

Then for a grid of candidate score thresholds, u, spanning the relevant score range around the boundary between dense normal scores and sparse anomalous scores, the anomaly detection application 140 estimates cumulative probabilities P ($S_{data} \le u$) and P ($S_{unif} \le u$) with Laplace smoothing. The anomaly detection application 140 then computes an EM(t) function for a grid of penalty parameters, t, as:

$$EM(t) = \max_u (P(S_{data} \le u) - t \cdot P(S_{unif} \le u))$$

The anomaly detection application 140 computes an EM-AUC score by integrating EM(t) over a grid of penalty parameters t. The anomaly detection application 140 determines the threshold from the candidate score thresholds based on regions where EM(t) is high, balancing (i) coverage of the dense, low-score region that represents normal operation and (ii) compactness of that normal region so that higher-score tails (sparser, rarer patterns) are excluded and treated as candidate anomalies I.

The EM-inspired scoring method avoids trivial thresholds determined purely by heuristics and provides an objective way to compare anomaly-detector settings (e.g., Isolation Forest configurations) and select operating thresholds.

The anomaly detection application 140 may select thresholds for each level. Then the anomaly detection application 140 may compare a level-specific anomaly score for a particular level to the determined threshold for the level to detect an anomaly. The anomaly detection application 140 may repeat this process for each level and/or each component in the topology.

Following the EM-inspired scoring, the method 300 proceeds to a step 310, where supervised and statistical anomaly classification is performed for detected anomalies to classify the severity of the anomalies. For example, the anomaly detection application 140 may determine that the level-specific anomaly metric corresponds to an anomaly. In response to determining that the level-specific anomaly metric corresponds to an anomaly, the anomaly detection application 140 may provide the current feature vectors and the level-specific anomaly metric to a machine learning model to determine a severity of the anomaly for impact classification.

The machine learning model for determining the severity of the anomaly may be a supervised machine learning model such as a random forest. In other implementations, the anomaly detection application 140 may utilize other supervised machine learning techniques such as gradient boosting, neural networks, deep learning, linear regression, polynomial regression, logistic regression, support vector machines, decision trees, nearest neighbors, etc.

The supervised machine learning model may be trained using the historical data corresponding to the level for historical anomalies such as historical feature vectors, historical level-specific anomaly metrics, and historical indications of the severity of the anomalies. The anomaly detection application 140 may obtain trouble tickets, outage logs, and performance KPIs associated with the historical anomalies where overlap with confirmed outages or multiple tickets labels anomalies as severe (performance-impacting), anomalies with no complaints or KPI degradation are labeled benign (non-impacting), and anomalies with some degradation or some complaints are labeled as moderate (chronic). The supervised machine learning model may apply statistical rules including enforcing minimum duration for chronic classification, requiring cross-metric consistency for severe optical issues, and suppressing anomalies during known maintenance or test windows. Accordingly, the supervised machine learning model is trained to classify anomalies as severe (performance-impacting), moderate (chronic), or benign (non-impacting).

The anomaly detection application 140 applies the current feature vectors for a level detected as anomalous and the level-specific anomaly metric to the supervised machine learning model (e.g., a random forest model) to generate a severity classification for the level. The machine learning model compares the current feature vectors and the level-specific anomaly score(s) to the labeled data to generate probabilities that the anomaly is severe, moderate, or benign. Then the anomaly detection application 140 may determine the severity classification for the anomaly having the highest probability or having a probability above a probability threshold.

For level-specific anomaly metrics that do not correspond to an anomaly (e.g., the level-specific anomaly metric does not exceed the selected threshold for the level), the anomaly detection application 140 may skip step 310.

With continued reference to FIG. 3, the method 300 then advances to a step 312, where semi-supervised customer-impact aggregation is executed. The step 312 includes constructing a graph of the topology where nodes represent components of the PON 100 and edges represent optical connections between the nodes according to the PON topology (e.g., RG↔ONT ↔FDH ↔OLT). At each node, the anomaly detection application 140 includes the number of anomalies, severity of the anomalies, and/or a duration of the anomalies.

The anomaly detection application 140 then initially labels some of the nodes as problematic having repeated customer complaints or outages. The anomaly detection application 140 also initially labels some nodes as negative that experienced long-term stability without complaints or outages. For the remaining nodes which are unlabeled, the anomaly detection application 140 propagates labels and risk across the topology graph to determine per-customer probabilities of acute versus chronic issues and likely root cause levels. More specifically, the anomaly detection application 140 uses semi-supervised learning to propagate labels to unlabeled nodes having a similar number of anomalies, severity of anomalies, and/or a duration of the anomalies to the labeled nodes. The anomaly detection application 140 may also propagate labels based on connectivity. For example, if an FDH is optically coupled to 10 ONTs, all of which are labeled as problematic, the anomaly detection application 140 may label the FDH as problematic.

Figure 5A:
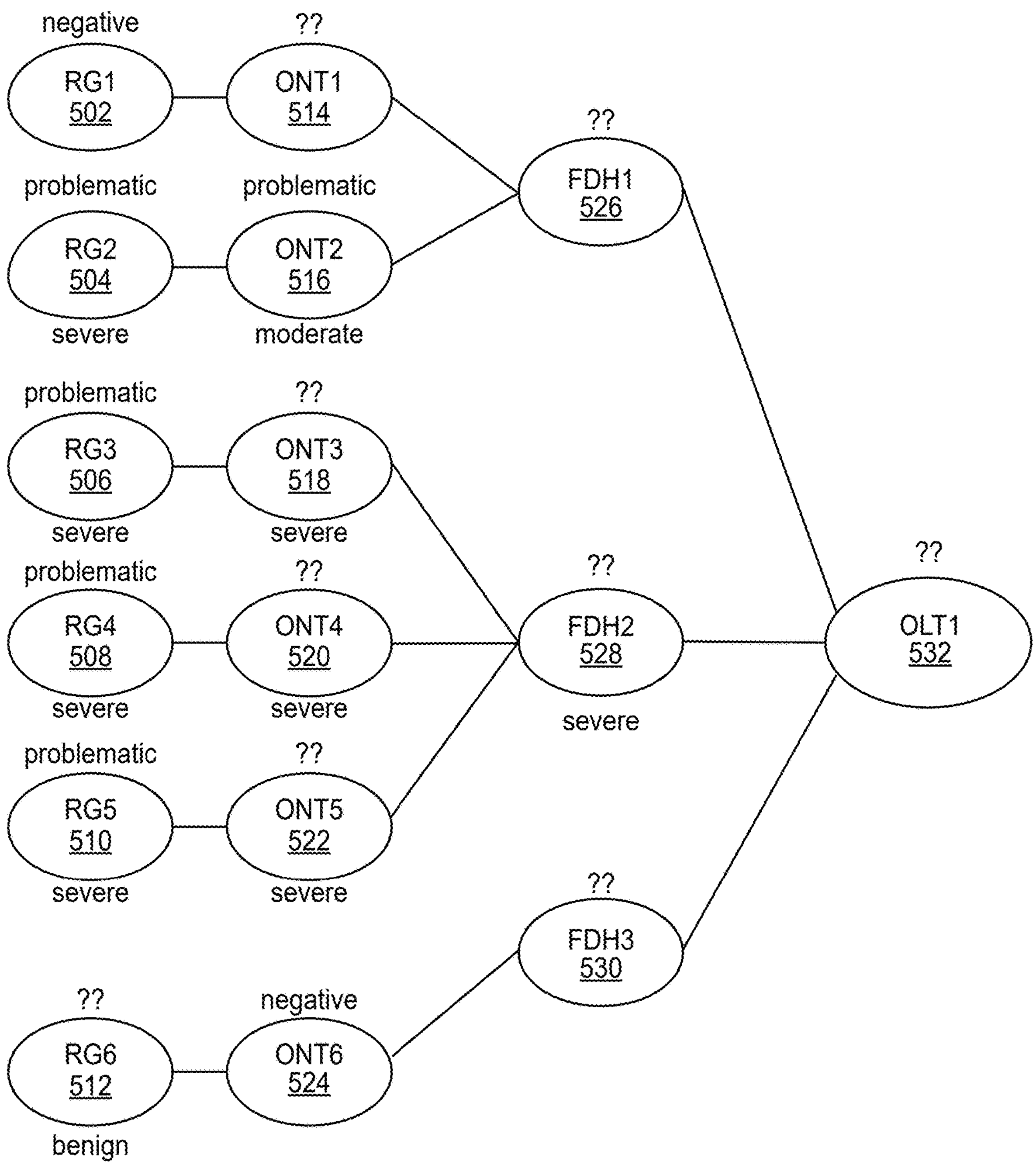
FIG. 5A illustrates an example graph data structure depicting components of the PON with initial anomaly status labels, according to aspects of the present disclosure.

FIG. 5A illustrates an example graph data structure depicting components 502-532 of the PON 100 with initial anomaly status labels. The graph includes edges corresponding to physical topology connections between the levels. In some implementations, the semi-supervised model may include optional co-impact relationship edges in the graph representing segments that frequently share issues in addition to the physical topology edges. The co-impact relationship edges may connect nodes that exhibit correlated anomaly patterns even when the nodes are not directly connected in the physical topology.

Additionally, the nodes 502-532 may include indications of the anomaly classification (severe, moderate, benign) if there is one. While not shown, the nodes 502-532 may also include indications of the number of anomalies, the duration of the anomalies, etc. While some of the nodes are initially labeled 502-510, 516, and 524, many of the nodes are unlabeled 512, 518-522, and 526-532.

Figure 5B:
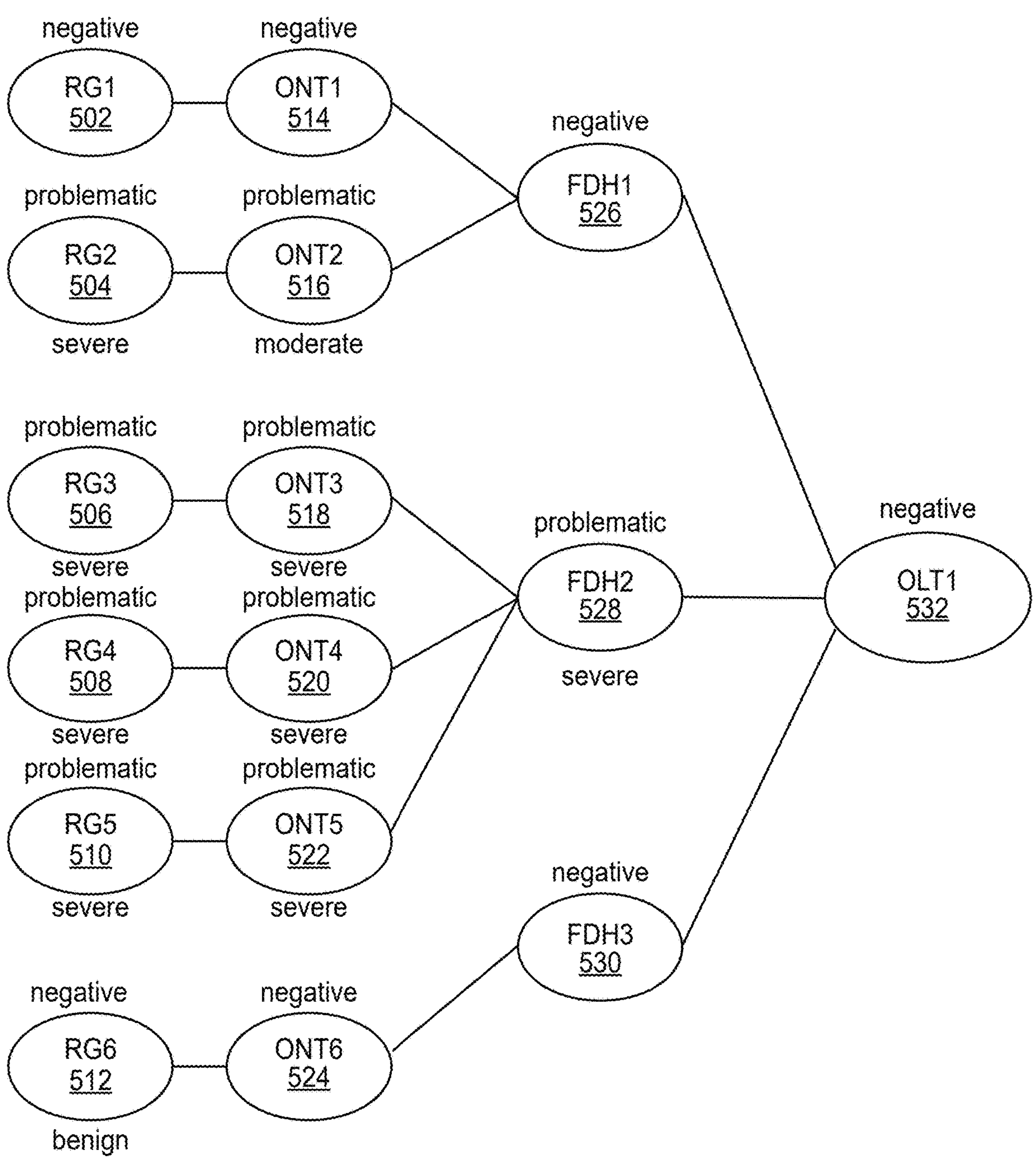
FIG. 5B illustrates an example graph data structure depicting components of the PON with propagated anomaly status labels, according to aspects of the present disclosure.

FIG. 5B illustrates the example graph data structure after the labels have been propagated to unlabeled nodes. The network topology in FIG. 5B shows the same components as FIG. 5A, with the unknown status labels resolved to final classifications for all nodes through the semi-supervised aggregation process.

The anomaly detection application 140 may propagate labels from labeled nodes to unlabeled nodes based on one or more of: patterns from connected nodes, similarity in feature vectors across the nodes, similarity in level-specific anomaly metrics, similarity in anomaly classification, the number of anomalies, or the duration of anomalies.

The semi-supervised aggregation layer may use label propagation or graph-based classification algorithms to propagate labels and risk across the topology graph based on connectivity, similarity in feature patterns, and cross-level relationships. The label propagation algorithm considers the labels assigned to neighboring nodes in the graph and the similarity between feature vectors, level-specific anomaly metrics, anomaly classification, number of anomalies, and/or duration of anomalies of connected nodes to infer labels for nodes that were previously assigned unknown status.

As further shown in FIG. 5B, ONT1 514, which had an unknown status in FIG. 5A, is now labeled with a negative status after label propagation. FDH1 526, which had an unknown status in FIG. 5A, is now labeled with a negative status. FDH3 530, which had an unknown status in FIG. 5A, is now labeled with a negative status. The label propagation algorithm determined these final classifications by analyzing the patterns from connected nodes, the similarity in feature vectors corresponding to each level, and/or the similarity in level-specific anomaly metrics, the similarity in anomaly classification, number of anomalies, and/or duration of anomalies across the topology.

ONT3 518, which had an unknown status in FIG. 5A, is now labeled with a problematic status. Additionally, ONT4

520 and ONT5 522, which had unknown statuses in FIG. 5A, are now labeled with problematic statuses. This may be because each of RG3 506, RG4 508, and RG5 510, which are connected to ONT3 518, ONT4 520, and ONT5 522, respectively, are labeled as problematic and have the same anomaly classifications (severe) as ONT3 518, ONT4 520, and ONT5 522.

Furthermore, FDH2 528, which had an unknown status in FIG. 5A, is now labeled with a problematic status. This may be because each of the ONTs 518-522 connected to FDH2 528 are labeled with a problematic status.

Still further, OLT1 532, which had an unknown status in FIG. 5A, is now labeled with a negative status. While OLT1 532 is connected to one FDH (FDH2 528) labeled as problematic, OLT1 532 is also connected to FDHs (FDH1 526 and FDH3 530) labeled as negative. Moreover, OLT1 532 may share more similarities in feature vectors and level-specific anomaly metrics with FDH1 526 and FDH3 530 than FDH2 528. OLT1 532 also does not have an anomaly classification and thus, a level-specific anomaly was not detected for OLT1 532.

The anomaly detection application 140 then uses the initial labels and propagated labels for the nodes to generate an anomaly detection for a particular customer or for a particular component of the PON. For example, the anomaly detection application 140 may generate a probability of an acute issue for a customer and/or a probability of a chronic issue for the customer. The anomaly detection application 140 may also generate a probability of an acute issue for a component and/or a probability of a chronic issue for the component. Then the anomaly detection application 140 may detect the anomaly for the customer in response to determining at least one of the probabilities exceeds a threshold.

Additionally, the anomaly detection application 140 may identify a suggested root cause level responsible for the anomaly (e.g., the local area network level, the ONT level, the FDH level, or the OLT level) based on the distribution of anomaly labels across the hierarchy. For example, if an FDH is labeled as problematic and each of the ONTs optically coupled to the FDH are labeled as problematic, the anomaly detection application 140 may determine the root cause level is the FDH level.

Turning back to FIG. 3, the method 300 continues to a step 314, where a prioritization engine (e.g., within the anomaly detection application 140) scores customers and components of the PON based on the severity of anomalies from the supervised classification, the acute and chronic probabilities from the semi-supervised aggregation, the root cause level from the label propagation analysis, the number of impacted customers under a shared component, the historical trouble tickets, the technical support organization (TSO) calls, the truck-roll visits, etc. The prioritization engine may generate a ranked list of customers and components, where the customers and components are ranked according to the scores.

Finally, the method 300 concludes with a step 316, where the prioritized results are output to a dashboard and maintenance workflow for proactive repair actions and operational decision-making. The ranked list may feed dashboards, ticketing systems, and planning tools for network operations center (NOC) and field teams. The ranked list enables proactive repair before hard outages occur, validation or avoidance of truck rolls, and targeting of known churn-risk customers with chronic issues.

Figure 6:
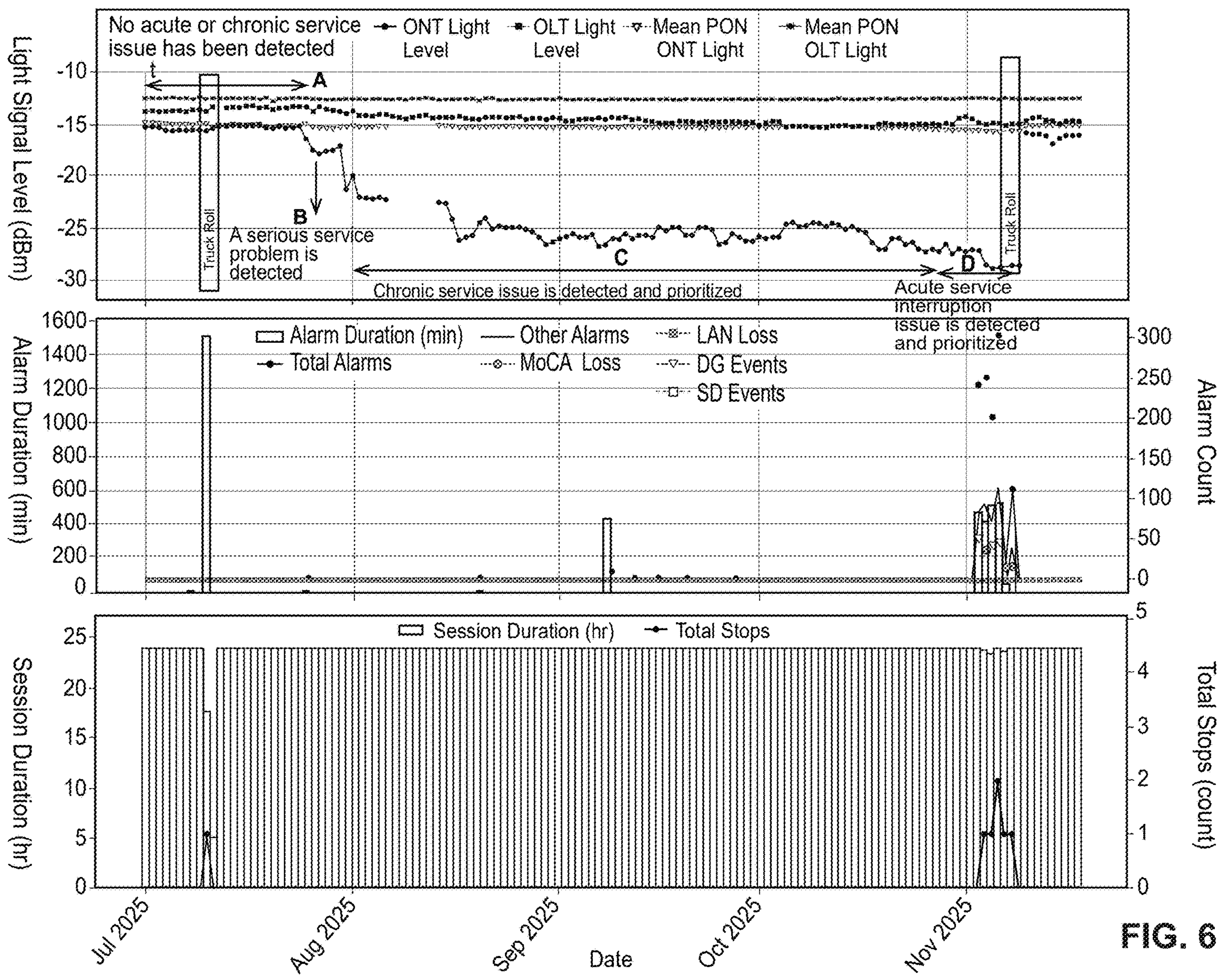
FIG. 6 depicts a multi-panel time-series plot illustrating progression of a network fault and detection capabilities of a multi-tier anomaly detection system, according to aspects of the present disclosure.

Referring to FIG. 6, a multi-panel time-series plot illustrates the progression of a network fault and the detection capabilities of the anomaly detection application 140 over a period spanning from July 2025 to November 2025. The multi-panel time-series plot demonstrates how the anomaly detection application 140 enables proactive detection of network issues before customer complaints or service outages occur.

The upper panel of FIG. 6 displays light signal level measurements in dBm on the vertical axis. The upper panel shows multiple traces including ONT light level, OLT light level, mean PON ONT light, and mean PON OLT light over time. A region labeled A indicates a period where no acute or chronic service issue has been detected by the anomaly detection application 140. During the region A, the light signal levels remain relatively stable and within normal operating parameters, and the anomaly detection application 140 does not flag the customer for maintenance action.

With continued reference to FIG. 6, a region labeled B marks a point where a serious service problem is detected by the anomaly detection application 140. The region B demonstrates that the anomaly detection application 140 identified a service-impacting condition based on the analysis of the level-specific anomaly metrics across the levels in the topology. A region labeled C spans a period where a chronic service issue is detected and prioritized by the anomaly detection application 140. During the region C, the anomaly detection application 140 identified a persistent degradation pattern in the optical signal levels that indicated an ongoing problem requiring maintenance attention. A region labeled D indicates where an acute service interruption issue is detected and prioritized by the anomaly detection application 140, resulting in a truck roll event. The region D corresponds to a severe service-impacting condition where the customer experienced loss of service.

The middle panel of FIG. 6 displays alarm duration in minutes on the left vertical axis and alarm count on the right vertical axis. The middle panel shows traces for total alarms, other alarms, MoCA loss, LAN loss, DG (Dying Gasp) events, and SD (signal degrade) events. The middle panel shows relatively low alarm activity throughout most of the time period with a significant spike in alarm duration and alarm count near the end of the observation period corresponding to the acute service interruption in region D. The correlation between the alarm activity in the middle panel and the optical signal degradation in the upper panel provides cross-metric consistency that the anomaly detection application 140 uses to classify the severity of detected anomalies.

As further shown in FIG. 6, the lower panel displays session duration in hours on the left vertical axis and total stops on the right vertical axis. The lower panel shows session duration as gray bars and total stops as a line trace. The session duration remains relatively consistent around twenty to twenty-five hours throughout most of the period, with notable drops occurring around the time of the truck rolls and near the end of the observation period when the acute service interruption occurs. The session stop patterns in the lower panel provide additional evidence that the anomaly detection application 140 uses to distinguish between benign fluctuations and service-impacting anomalies.

The multi-panel time-series plot in FIG. 6 demonstrates that without the anomaly detection application 140, unnecessary truck rolls may be triggered during periods when no actual service-impacting issue exists, and such truck rolls may even worsen the network condition. With the anomaly detection application 140, operations may avoid unnecessary truck rolls during periods like region A and may resolve actual issues at the time of detection in regions B, C, and D, preventing months of chronic problems and eventual outages.

When the anomaly detection application 140 detects an anomaly in region B, region C, or region D, the server 130 or the computing device 125 may transmit a control signal to a component of the PON 100 such as an ONT or RG to optionally automatically reboot or reset the component. The automatic reboot may resolve transient issues without requiring a truck roll or human intervention.

Figure 7:
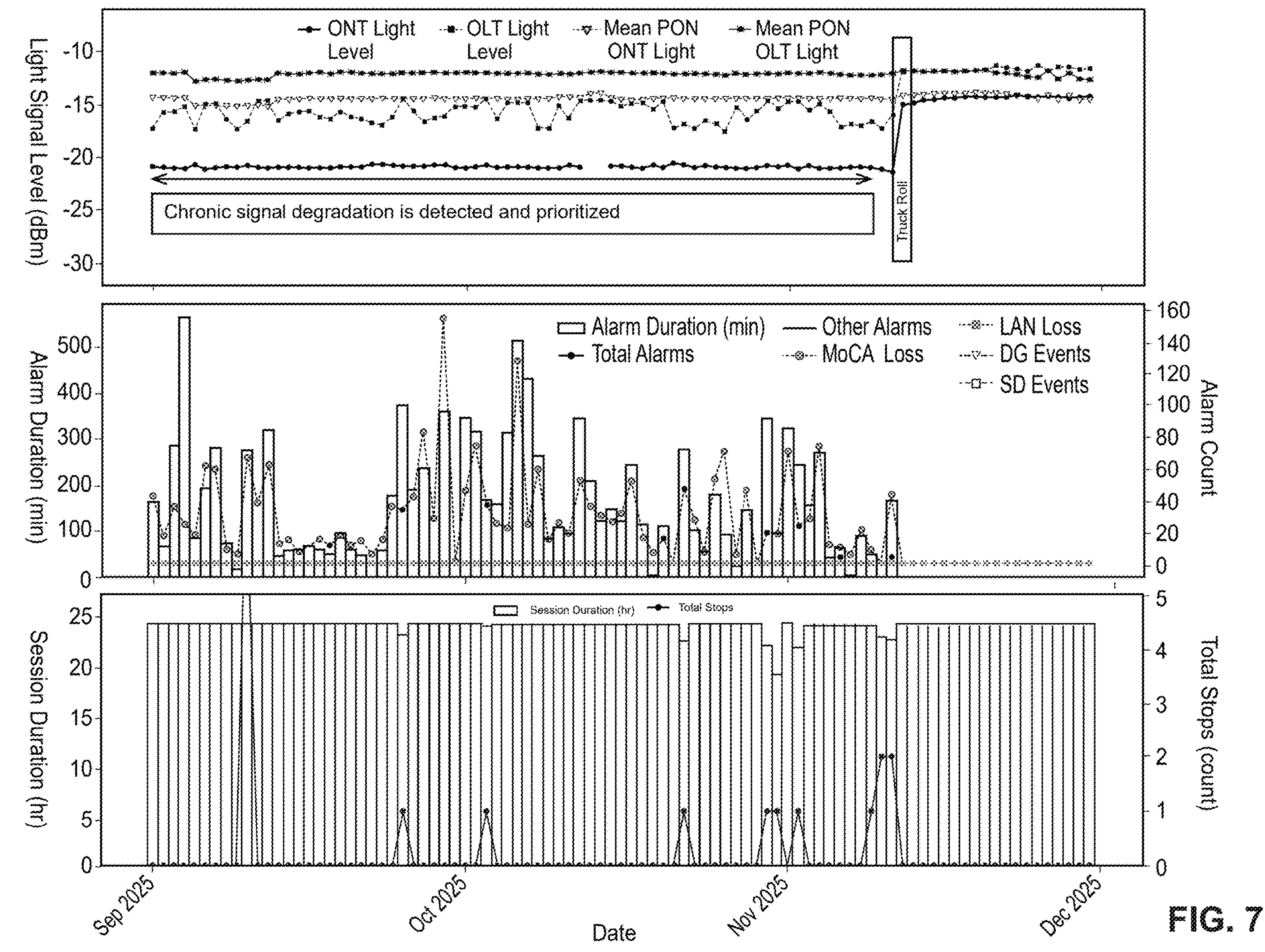
FIG. 7 depicts a multi-panel time-series plot illustrating chronic signal degradation detection and prioritization, according to aspects of the present disclosure.

Referring to FIG. 7, a multi-panel time-series plot illustrates the detection of chronic signal degradation by the anomaly detection application 140 over a period spanning from September 2023 to December 2023. The multi-panel time-series plot demonstrates the capability of the anomaly detection application 140 to identify persistent underlying issues with signal quality before total service failure occurs, enabling proactive maintenance actions that may resolve problems before customer-impacting outages.

The top panel of FIG. 7 displays light signal level measurements in dBm on the vertical axis. The top panel shows multiple traces including ONT light level, OLT light level, mean PON ONT light, and mean PON OLT light over time. A highlighted region with an annotation indicates where chronic signal degradation is detected and prioritized by the anomaly detection application 140. Within the region, the ONT light level trace shows values around negative twenty dBm that fall below the mean PON ONT light reference level throughout the highlighted period. The deviation of the ONT light level below the mean PON ONT light reference level indicates that the ONT for the customer is experiencing degraded signal conditions compared to peer optical network terminals on the same PON segment.

With continued reference to FIG. 7, the anomaly detection application 140 may generate a likelihood of a chronic anomaly based on feature vectors for the ONT level obtained over a chronic time window (e.g., 30-days). The chronic time window may span multiple days or weeks to capture persistent degradation patterns that distinguish chronic issues from transient fluctuations. The highlighted region in the top panel spans a period of several weeks during which the ONT light level consistently remains below the mean PON ONT light reference, indicating a sustained degradation condition rather than an acute spike. The anomaly detection application 140 analyzes the feature vectors for the ONT level corresponding to the chronic time window to identify patterns where optical signal levels exhibit persistent deviation from baseline or peer-normalized values over an extended duration.

The middle panel of FIG. 7 presents alarm duration in minutes on the left vertical axis and alarm count on the right vertical axis. The middle panel displays multiple alarm categories including alarm duration, total alarms, other alarms, LAN loss, MoCA loss, SD (signal degrade) events, and DG (Dying Gasp) events. Bar graphs show alarm durations and line traces show alarm counts that exhibit periodic spikes throughout the monitoring period. The alarm activity in the middle panel provides corroborating evidence that the anomaly detection application 140 uses in conjunction with the optical signal degradation shown in the top panel to classify the detected condition as a chronic service issue. The periodic alarm spikes in the middle panel correlate with the sustained optical signal degradation in the highlighted region, indicating that the underlying signal quality issue is manifesting as intermittent alarm events.

As further shown in FIG. 7, the bottom panel shows session duration in hours on the left vertical axis and total stops count on the right vertical axis. Bar graphs represent session duration values consistently around twenty to twenty-five hours, and a line trace shows total stops that remains relatively stable with minor variations across the time period. The horizontal axis across all three panels represents time with markers at September 2023, October 2023, November 2023, and December 2023. The session duration and total stops patterns in the bottom panel indicate that while the chronic signal degradation has not yet caused complete service failure, the underlying issue persists and may escalate to a service-impacting outage if not addressed through proactive maintenance.

The multi-panel time-series plot in FIG. 7 demonstrates that the anomaly detection application 140 may detect chronic signal degradation well in advance of total service failure by analyzing data obtained over a chronic time window. By detecting the chronic condition early during the highlighted region, the anomaly detection application 140 enables proactive maintenance actions that may resolve the problem before the problem escalates into a customer-impacting outage requiring a truck roll. The chronic anomaly detection capability allows network operators to prioritize maintenance resources toward subscribers experiencing persistent degradation patterns that indicate elevated risk of future service interruption.

Figure 8:
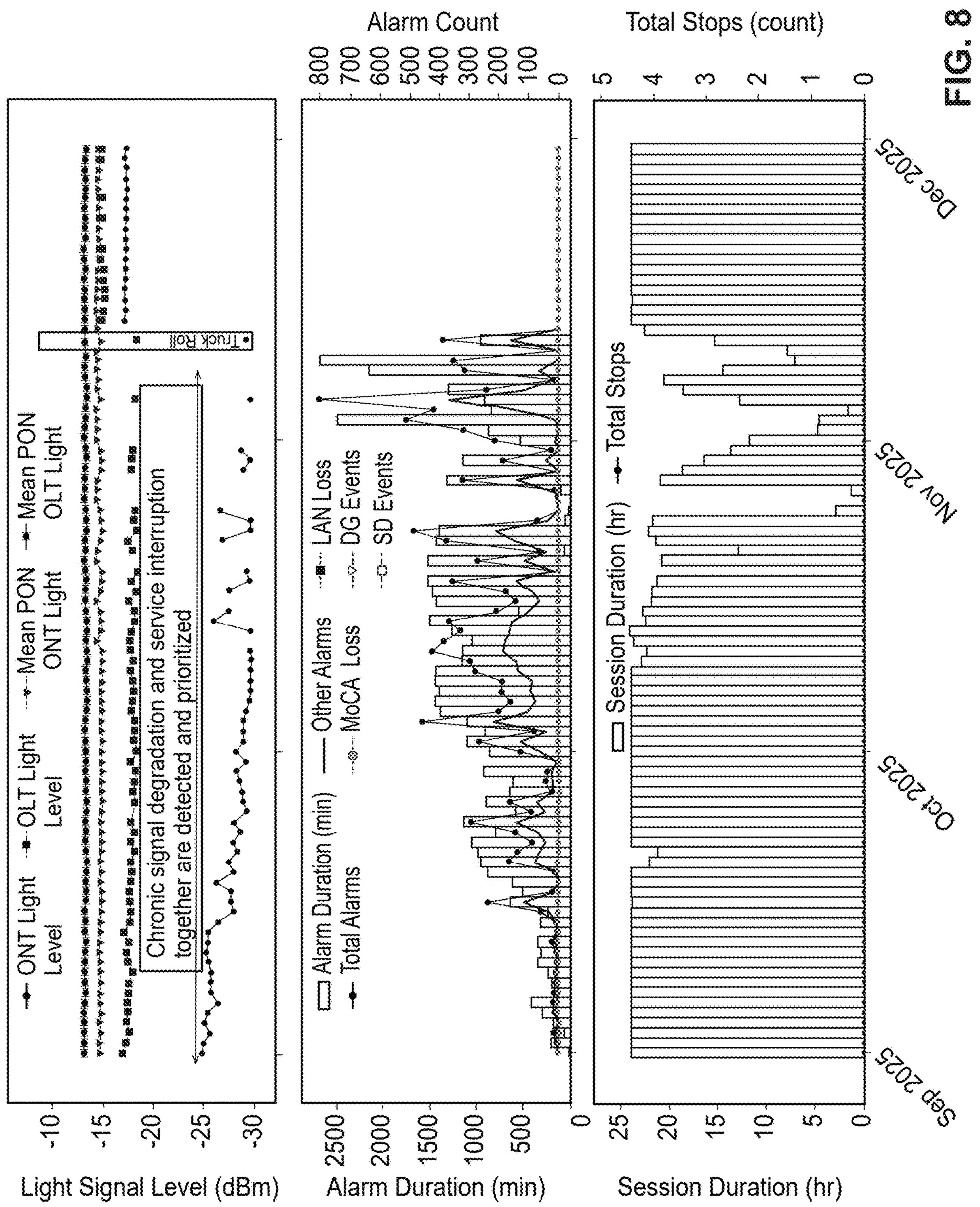
FIG. 8 depicts a multi-panel time-series plot showing chronic signal degradation and service interruption detected together, according to aspects of the present disclosure.

Referring to FIG. 8, a multi-panel time-series plot illustrates the detection of both chronic signal degradation and service interruption together by the anomaly detection application over a period spanning from September 2025 to December 2025. The multi-panel time-series plot demonstrates the capability of the anomaly detection application to recognize the complete lifecycle of a network fault, from initial onset as chronic degradation to culmination in a service-impacting event, enabling more informed maintenance decisions based on the total history of impairment.

The top panel of FIG. 8 displays light signal level measurements in dBm on the vertical axis, ranging from approximately negative ten to negative thirty dBm. Multiple data series are shown including ONT Light Level, OLT Light Level, Mean PON ONT Light Level, and Mean PON OLT Light Level. The Mean PON ONT Light Level, Mean PON OLT Light Level and OLT Light Level traces remain relatively stable in the upper portion of the panel around negative fourteen to negative eighteen dBm, while the ONT Light Level traces show significant degradation and variability in the lower portion of the panel, dropping to approximately negative twenty-five to negative thirty dBm during certain periods. A double-headed arrow spans a region of the top panel with an annotation indicating that chronic signal degradation and service interruption together are detected and prioritized by the anomaly detection application 140. A vertical gray band labeled Truck Roll appears near the right side of the plot indicating when a maintenance dispatch occurred.

With continued reference to FIG. 8, the highlighted region demonstrates that the anomaly detection application 140 successfully detected the entire progression of the fault, from initial onset as a chronic degradation to culmination in a service-impacting event. The anomaly detection application 140 may generate a likelihood of an acute anomaly based on first feature vectors for the ONT level obtained over an acute time window (e.g., below a threshold amount of time), and may generate a likelihood of a chronic anomaly based on second feature vectors for the ONT level obtained over a chronic time window (e.g., above the threshold amount of time). By analyzing both the acute and chronic time windows, the anomaly detection application 140 identifies the relationship between the sustained signal degradation pattern and the subsequent service interruption, recognizing that both conditions are part of the same evolving issue rather than separate unrelated events.

The middle panel of FIG. 8 displays alarm duration in minutes on the left vertical axis and alarm count on the right vertical axis. Bar elements represent alarm duration while line traces show various alarm types including Other Alarms, Total Alarms, MoCA Loss, LAN Loss, DG (Dying Gasp) Events, and SD (Signal Degrade) Events. The alarm activity shows elevated levels during the period corresponding to the signal degradation in the top panel, with peaks reaching approximately two thousand minutes of alarm duration and alarm counts reaching several hundred. The correlation between the elevated alarm activity in the middle panel and the optical signal degradation in the top panel provides cross-metric consistency that the anomaly detection application uses to classify the detected condition as a combined chronic and acute service issue. The sustained elevation in alarm duration and alarm count during the highlighted region indicates that the underlying signal quality issue is manifesting as persistent alarm events that correlate with the optical degradation pattern.

As further shown in FIG. 8, the bottom panel displays session duration in hours on the left vertical axis and total stops count on the right vertical axis. Bar elements represent session duration while a line trace shows total stops. The session duration generally remains around twenty to twenty-four hours with periodic drops, and the total stops line shows occasional spikes corresponding to service interruption events. The session interruption patterns in the bottom panel correlate with the optical signal degradation in the top panel and the elevated alarm activity in the middle panel, providing additional evidence that the anomaly detection application uses to recognize the complete fault lifecycle. The periodic drops in session duration and corresponding spikes in total stops during the highlighted region indicate that the chronic signal degradation has progressed to cause intermittent service interruptions that impact customer experience.

The comprehensive view provided by the multi-panel time-series plot in FIG. 8 allows for more informed maintenance decisions based on the total history of impairment. By detecting both the chronic degradation and the service interruption as part of the same evolving issue, the anomaly detection application 140 enables network operators to understand the full context of the fault condition when dispatching maintenance resources. The correlation between signal degradation in the top panel, elevated alarm activity in the middle panel, and session interruptions in the bottom panel provides a complete picture of the fault progression that informs prioritization decisions and root cause analysis. The truck roll event shown near the right side of the plot occurred after the anomaly detection application 140 had already identified both the chronic and acute components of the fault, demonstrating that the anomaly detection application 140 may detect the complete fault lifecycle in advance of maintenance dispatch.

Figure 9:
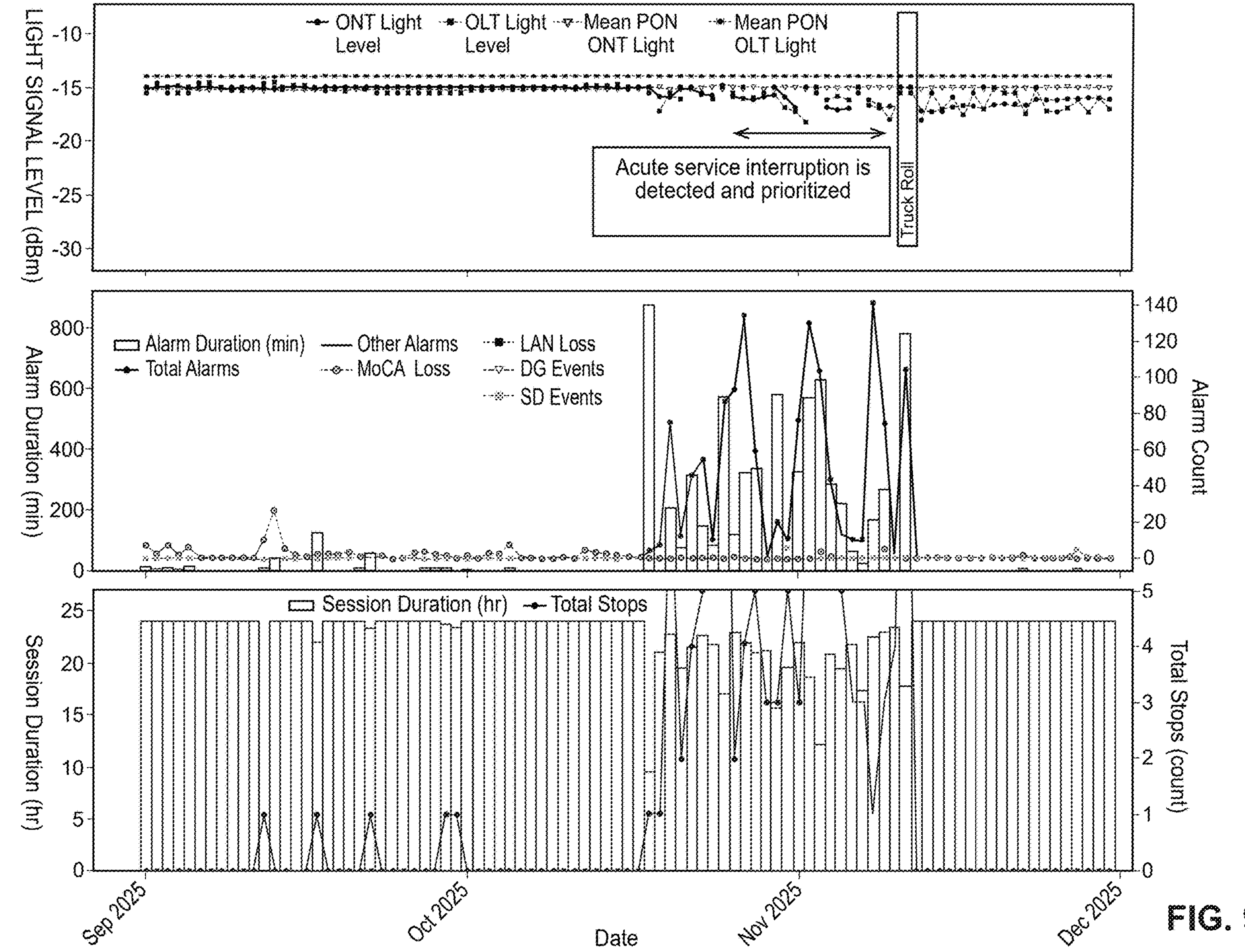
FIG. 9 depicts a multi-panel time-series plot illustrating detection of an acute service interruption, according to aspects of the present disclosure.

Referring to FIG. 9, a multi-panel time-series plot illustrates the detection of an acute service interruption by the anomaly detection application 140 over a period spanning from September 2025 to December 2025. The multi-panel time-series plot demonstrates the capability of the anomaly detection application 140 to pinpoint acute service interruptions with accuracy, ensuring that severe immediate failures are correctly identified and prioritized for urgent resolution.

The top panel of FIG. 9 displays light signal level measurements in dBm over time from September 2025 through December 2025. The top panel shows multiple traces including ONT light level, OLT light level, mean PON ONT light, and mean PON OLT light. A double-headed arrow spans a period where an annotation indicates that an acute service interruption is detected and prioritized by the anomaly detection application 140, with a notation for a truck roll event occurring near the end of the highlighted period. Within the highlighted region, the light signal level traces exhibit a signal drop coupled with a spike in alarms and stops indicating a severe immediate loss of service. The drop in signal level characterizes the acute nature of the service interruption, distinguishing the acute interruption from the gradual degradation patterns associated with chronic issues.

With continued reference to FIG. 9, the anomaly detection application 140 may generate a likelihood of an acute anomaly based on feature vectors for the ONT level obtained over an acute time window. The acute time window may span hours or a small number of days to capture rapid changes in signal levels and alarm patterns that indicate immediate service-impacting conditions. The highlighted region in the top panel corresponds to a timeframe where the anomaly detection application 140 analyzed the feature vectors for the ONT level obtained over the acute time window and determined that the signal level drop and corresponding alarm activity exceeded thresholds indicative of an acute service interruption. By analyzing data over the acute time window, the anomaly detection application distinguishes between transient fluctuations that resolve without intervention and severe immediate failures that require urgent maintenance action.

The middle panel of FIG. 9 shows alarm duration in minutes on the left vertical axis and alarm count on the right vertical axis. The middle panel tracks multiple alarm types including total alarms, other alarms, MoCA loss, LAN loss, DG (Dying Gasp) events, and SD (Signal Degrade) events over the same time period. The middle panel reveals significant spikes in both alarm duration and alarm count during the period corresponding to the detected acute service interruption in the highlighted region. The alarm durations reach approximately 800 minutes and alarm counts exceed 120 during peak events within the highlighted region. The correlation between the signal level drop in the top panel and the significant spikes in alarm duration and alarm count in the middle panel provides cross-metric consistency that the anomaly detection application uses to classify the detected condition as a severe service-impacting acute interruption rather than a benign fluctuation or moderate chronic issue.

As further shown in FIG. 9, the bottom panel presents session duration in hours on the left vertical axis and total stops on the right vertical axis. The bottom panel displays the relationship between session duration and total session stops over time. The session duration bars show periods of reduced session time coinciding with increased total stops during the detected interruption period in the highlighted region. The reduced session duration and increased total stops indicate service disruption patterns that correlate with the optical signal degradation shown in the top panel and the elevated alarm activity shown in the middle panel. The session interruption patterns in the bottom panel provide additional evidence that the anomaly detection application 140 uses to confirm that the detected acute anomaly is causing customer-impacting service disruption.

The multi-panel time-series plot in FIG. 9 demonstrates that the anomaly detection application accurately identifies the specific timeframe where a severe immediate loss of service occurs. The combination of the sharp signal level drop in the top panel, the significant spikes in alarm duration and alarm count in the middle panel, and the reduced session duration with increased total stops in the bottom panel provides comprehensive evidence that the anomaly detection application 140 uses to prioritize the acute failure for urgent resolution. By generating a likelihood of an acute anomaly based on feature vectors for the ONT level obtained over an acute time window, the anomaly detection application 140 ensures that severe immediate failures are correctly identified and escalated for prompt maintenance action, reducing the time between fault occurrence and service restoration.

Figure 10:
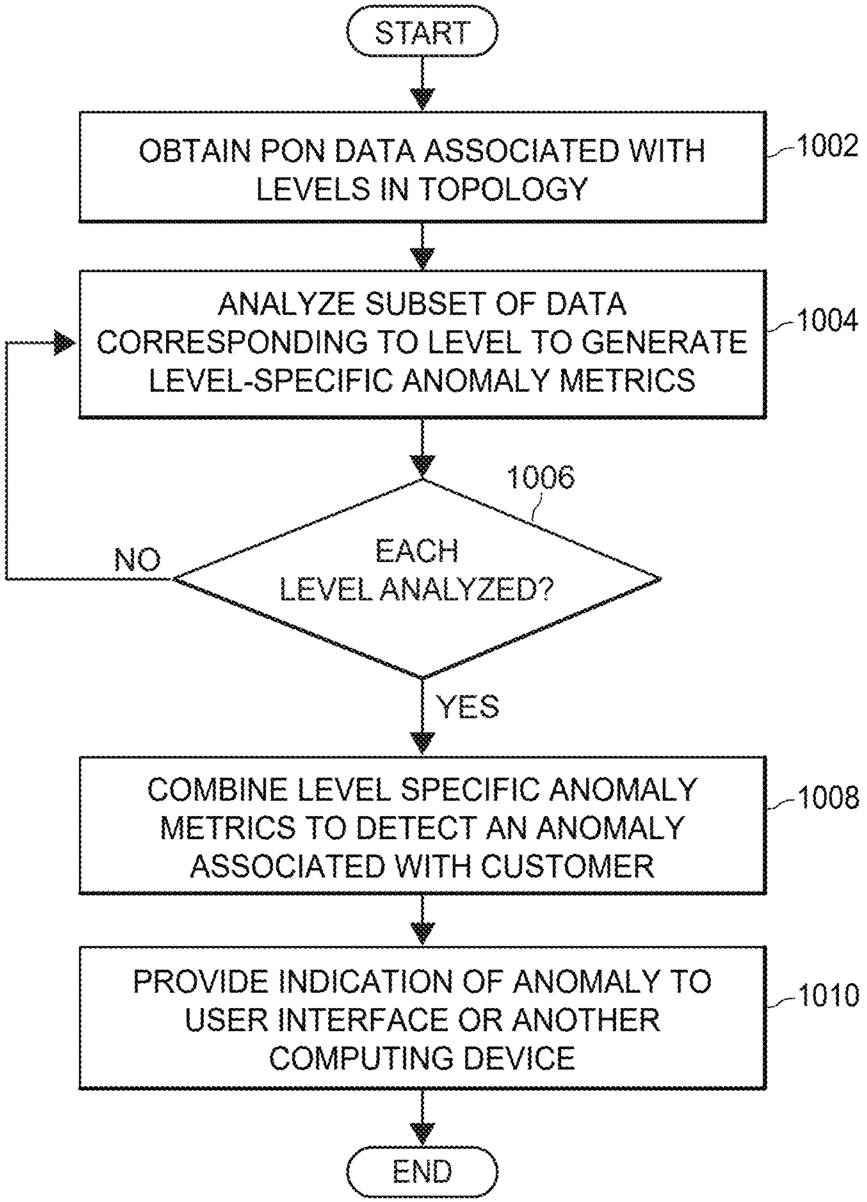
FIG. 10 is a flowchart of an example method for detecting anomalies in a PON using topology-aware analysis, which may be performed by a server device of FIG. 1.

Referring to FIG. 10, a method 1000 for detecting anomalies in a passive optical network using topology-aware analysis is illustrated. The method 1000 may be performed by the anomaly detection application 140 executing on the server 130 or the computing device 125. The method 1000 demonstrates a hierarchical approach to anomaly detection that aligns with the physical topology of the passive optical network 100, allowing for level-by-level analysis before combining results to identify customer-impacting issues.

The method 1000 begins with a step 1002, where PON data associated with multiple levels in a topology is obtained. At step 1002, the anomaly detection application 140 may obtain data for a customer in the PON 100 associated with multiple levels in the topology. The levels in the topology may include a local area network level corresponding to a wireless network component that communicates with an ONT for the customer, an ONT level corresponding to the ONT for the customer, an FDH level corresponding to an FDH optically connected to the customer ONT, and/or an OLT level corresponding to the ONT 102 optically connected to the FDH which is optically connected to the customer ONT. The anomaly detection application 140 may categorize the PON data from the various network elements by level.

With continued reference to FIG. 10, the method 1000 then proceeds to a step 1004, where a subset of data corresponding to a level is analyzed to generate level-specific anomaly metrics. At the step 1004, the anomaly detection application 140 may analyze a subset of the data corresponding to the level to generate a level-specific anomaly metric. The analysis at the step 1004 may involve processing telemetry and operational data from a particular hierarchical level to identify patterns that deviate from normal behavior. The anomaly detection application 140 may provide the subset of the data to a machine learning model for the level to generate the level-specific anomaly metric, where the machine learning model is trained using historical data corresponding to the level. The machine learning model may be an unsupervised machine learning model such as an Isolation Forest model trained on historical periods known to be predominantly healthy. The Isolation Forest model may output a level-specific anomaly score (from 0 to 1). In some implementations, the anomaly detection application 140 compares the level-specific anomaly score to a threshold to determine whether or not the level-specific anomaly score corresponds to an anomaly. For example, the threshold may be determined using the EM-inspired scoring method described above.

Following the analysis at the step 1004, the method 1000 moves to a step 1006, which is a decision point that checks whether each level has been analyzed. If not all levels have been analyzed as indicated by a No branch, the method 1000 returns to the step 1004 to analyze the subset of data corresponding to the next level in the topology. This iterative loop ensures that level-specific anomaly metrics are generated for each hierarchical level of the PON 100. The iterative analysis at the step 1004 and the step 1006 may process data from the local area network level, the ONT level, the FDH level, and the OLT level. In addition to generating level-specific anomaly metrics for each level corresponding to components coupled to the customer's RG or other wireless network component, the anomaly detection application 140 may also generate level-specific anomaly metrics for each component in the PON 100, or for each component coupled to the same OLT as the customer's ONT.

As further shown in FIG. 10, once each level has been analyzed as indicated by a Yes branch at the step 1006, the method 1000 proceeds to a step 1008, where the level-specific anomaly metrics are combined to detect an anomaly associated with a customer. At the step 1008, the anomaly detection application 140 may combine the level-specific anomaly metrics for the different levels to provide a comprehensive assessment of potential issues affecting customer service. The combination at the step 1008 may involve generating a graph in accordance with the topology of the PON 100 having nodes corresponding to the levels and edges corresponding to optical connections between the levels. The anomaly detection application 140 may propagate labels from labeled nodes to unlabeled nodes based on patterns from connected nodes, similarity in subsets of the data, similarity in level-specific anomaly metrics, or similarity in anomaly classification, number of anomalies, and/or duration of anomalies. The anomaly detection application 140 may generate a likelihood of the anomaly based on labels assigned to the nodes and may detect the anomaly in response to determining the likelihood exceeds a threshold. For example, the anomaly detection application 140 may generate a likelihood of an acute anomaly for the customer and/or a likelihood of a chronic anomaly for the customer.

The method 1000 concludes with a step 1010, where an indication of the anomaly is provided to a user interface or another computing device, such as the computing device 125. The indication of the anomaly may include a ranked list of customers and components of the PON 100 in need of repair based on one or more of: a severity of anomalies associated with each customer, a number of anomalies associated with each customer, a number of customers under a shared component, a root cause location of the anomalies, or the acute and/or chronic probabilities of an anomaly. The indication of the anomaly enables network operators to take appropriate action based on the detected anomaly, including proactive repair before hard outages occur, validation or avoidance of truck rolls, and targeting of known churn-risk customers with chronic issues.

In some implementations, the method 1000 may further include transmitting a control signal to optionally automatically reboot a component of the passive optical network 100 in response to detecting the anomaly at the step 1008. In some implementations, the method 1000 may further include performing a root cause analysis to detect which of the levels is the root cause of the anomaly based on the level-specific anomaly metrics for the levels in the topology. The root cause analysis may output a suggested root cause level being in-home RG/WiFi, ONT, FDH/Terminal, or OLT based on the distribution of anomaly labels across the hierarchy.

Additional Considerations

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific examples have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of the disclosure. Additionally, the described examples should not be interpreted as mutually exclusive, and should instead be understood as potentially combinable if such combinations are permissive in any way. In other words, any feature disclosed in any of the aforementioned examples may be included in any of the other aforementioned examples.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1)

at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus, the following claims are hereby incorporated into the Detailed Description, with each claim standing on its own as a separately claimed subject matter.

Further, as used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The examples are not limited in this context.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification and the attached drawings, specific examples have been described. However, one of ordinary skill in the art appreciates that various modifications and changes can be made in view of aspects of this disclosure without departing from the scope of the disclosure as set forth in the claims below. Accordingly, the specification and figures are to be regarded in an illustrative rather than a restrictive sense, and all such modifications made in view of aspects of this disclosure are intended to be included within the scope of present teachings. Numerous alternative examples could be implemented, using either current technology or technology developed after the filing date of this patent, which would still fall within the scope of the claims. By way of example, and not limitation, the disclosure herein contemplates at least the following examples:

1. A method for detecting an anomaly in a Passive Optical Network (PON), the method comprising: obtaining data for a customer in a PON associated with a plurality of levels in a topology, the PON including an optical line terminal (OLT) optically connected to a plurality of optical network terminals (ONTs) via a plurality of optical fibers, wherein the plurality of levels include two or more of: a local area network level corresponding to a wireless network component that communicates with an ONT for the customer, an ONT level corresponding to the ONT for the customer, a fiber distribution hub (FDH) level corresponding to an FDH optically connected to the customer ONT, or an OLT level corresponding to the OLT optically connected to the FDH which is optically connected to the customer ONT; for each of the plurality of levels, analyzing a subset of the data corresponding to the level to generate a level-specific anomaly metric; combining the level-specific anomaly metrics to detect an anomaly associated with the customer; and providing an indication of the anomaly to at least one of a user interface or another computing device.

2. The method of example 1, further comprising: transmitting a control signal to automatically reboot a component of the PON in response to detecting the anomaly.

3. The method of example 1 or example 2, further comprising: performing a root cause analysis to detect which of the plurality of levels is the root cause of the anomaly based on the level-specific anomaly metrics for the plurality of levels in the topology.

4. The method of any of examples 1 to 3, wherein analyzing a subset of the data corresponding to the level to generate a level-specific anomaly metric includes: providing the subset of the data to a machine learning model for the level to generate the level-specific anomaly metric, wherein the machine learning model is trained using historical data corresponding to the level.

5. The method of any of examples 1 to 4, wherein the machine learning model is an unsupervised machine learning model and further comprising: determining that the level-specific anomaly metric corresponds to an anomaly; in response to determining that the level-specific anomaly metric corresponds to an anomaly, providing the subset of the data and the level-specific anomaly metric to a supervised machine learning model to determine a severity of the anomaly for impact classification, wherein the supervised machine learning model is trained using the historical data corresponding to the level for anomalies, historical level-specific anomaly metrics, and historical indications of the severity of the anomalies.

6. The method of any of examples 1 to 5, wherein providing the indication of the anomaly includes: generating, by the one or more processors, a ranked list of customers and components of the PON in need of repair based on one or more of: a severity of anomalies associated with each customer, a number of anomalies associated with each customer, a number of customers under a shared component, or a root cause location of the anomalies.

7. The method of any of examples 1 to 6, wherein combining the level-specific anomaly metrics includes: generating a graph in accordance with the topology of the PON having nodes corresponding to the plurality of levels and edges corresponding to optical connections between the plurality of levels; labeling one or more of the nodes in the graph based on historical patterns indicating stability or instability; propagating labels from labeled nodes to unlabeled nodes based on one or more of: patterns from connected nodes, similarity in subsets of the data, or similarity in level-specific anomaly metrics; generating a likelihood of the anomaly based on labels assigned to the nodes; and detecting the anomaly in response to determining the likelihood exceeds a threshold.

8. The method of any of examples 1 to 7, wherein generating the likelihood of the anomaly includes: generating a likelihood of an acute anomaly based on a first subset of the data obtained over an acute time window below a threshold amount of time; and generating a likelihood of a chronic anomaly based on a second subset of the data obtained over a chronic time window above the threshold amount of time.

9. The method of any of examples 1 to 8, further comprising: for each of the plurality of levels: generating feature vectors over a moving time window based on the subset of the data corresponding to the level; and generating the level-specific anomaly metric using the feature vectors.

10. The method of any of examples 1 to 9, wherein the feature vectors include a plurality of parameters including one or more of: a moving average, a variance, a percentile, or a drift for the plurality of parameters over the moving time window.

11. The method of any of examples 1 to 10, wherein the feature vectors for the level are normalized relative to peer components associated with the level.

12. The method of any of examples 1 to 11, wherein the subset of the data corresponding to the OLT level includes one or more of: an optical power, a signal attenuation metric from the OLT to the ONT, a bit error rate (BER), or a PON alarm.

13. The method of any of examples 1 to 12, wherein the subset of the data corresponding to the FDH level includes one or more of: a virtual optical average from ONTs under the FDH, or an aggregated alarm metric for the ONTs under the FDH.

14. The method of any of examples 1 to 13, wherein the subset of the data corresponding to the ONT level includes one or more of: a received optical power at the ONT, a transmitted optical power from the ONT, an estimated distance to the OLT, a deviation of optical power from the FDH compared to the ONT, a differential from the received optical power at the ONT to a received optical power at the OLT, or a local alarm at the ONT.

15. The method of any of examples 1 to 14, wherein the subset of the data corresponding to the local area network level includes one or more of: a received signal strength at the wireless network component, a system event at the wireless network component, a packet error rate at the wireless network component, a processor utilization at the wireless network component, a memory utilization at the wireless network component, or a latency metric at the wireless network component.

16. A computing device for detecting an anomaly in a Passive Optical Network (PON), the computing device comprising: one or more processors; and a non-transitory computer-readable memory storing instructions thereon that, when executed by the one or more processors, cause the computing device to: obtain data for a customer in a PON associated with a plurality of levels in a topology, the PON including an optical line terminal (OLT) optically connected to a plurality of optical network terminals (ONTs) via a plurality of optical fibers, wherein the plurality of levels include two or more of: a local area network level corresponding to a wireless network component that communicates with an ONT for the customer, an ONT level corresponding to the ONT for the customer, a fiber distribution hub (FDH) level corresponding to an FDH optically connected to the customer ONT, or an OLT level corresponding to the OLT optically connected to the FDH which is optically connected to the customer ONT; for each of the plurality of levels, analyze a subset of the data corresponding to the level to generate a level-specific anomaly metric; combine the level-specific anomaly metrics to detect an anomaly associated with the customer; and provide an indication of the anomaly to at least one of a user interface or another computing device.

17. The computing device of example 16, wherein the instructions further cause the computing device to: transmit a control signal to automatically reboot a component of the PON in response to detecting the anomaly.

18. The computing device of example 16 or example 17, wherein the instructions further cause the computing device to: perform a root cause analysis to detect which of the plurality of levels is the root cause of the anomaly based on the level-specific anomaly metrics for the plurality of levels in the topology.

19. The computing device of any of examples 16 to 18, wherein to analyze a subset of the data corresponding to the level to generate a level-specific anomaly metric, the instructions cause the computing device to: provide the subset of the data to a machine learning model for the level to generate the level-specific anomaly metric, wherein the machine learning model is trained using historical data corresponding to the level.

20. The computing device of any of examples 16 to 19, wherein the machine learning model is an unsupervised machine learning model and the instructions further cause the computing device to: determine that the level-specific anomaly metric corresponds to an anomaly; in response to determining that the level-specific anomaly metric corresponds to an anomaly, provide the subset of the data and the level-specific anomaly metric to a supervised machine learning model to determine a severity of the anomaly, wherein the supervised machine learning model is trained using the historical data corresponding to the level for anomalies, historical level-specific anomaly metrics, and historical indications of the severity of the anomalies.

Additionally, the benefits, advantages, solutions to problems, and any element(s) that may cause any benefit, advantage, or solution to occur or become more pronounced are not to be construed as a critical, required, or essential features or elements of any or all the claims.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method for detecting an anomaly in a Passive Optical Network (PON), the method comprising:

obtaining data for a customer in a PON associated with a plurality of levels in a topology, the PON including an optical line terminal (OLT) optically connected to a plurality of optical network terminals (ONTs) via a plurality of optical fibers, wherein the plurality of levels include two or more of: a local area network level corresponding to a wireless network component that communicates with an ONT for the customer, an ONT level corresponding to the ONT for the customer, a fiber distribution hub (FDH) level corresponding to an FDH optically connected to the customer ONT, or an OLT level corresponding to the OLT optically connected to the FDH which is optically connected to the customer ONT;

for each of the plurality of levels, analyzing a subset of the data corresponding to the level to generate a level-specific anomaly metric;

combining the level-specific anomaly metrics to detect an anomaly associated with the customer; and providing an indication of the anomaly to at least one of a user interface or another computing device.

2. The method of claim 1, further comprising:

transmitting a control signal to automatically reboot a component of the PON in response to detecting the anomaly.

3. The method of claim 1, further comprising:

performing a root cause analysis to detect which of the plurality of levels is the root cause of the anomaly based on the level-specific anomaly metrics for the plurality of levels in the topology.

4. The method of claim 1, wherein analyzing a subset of the data corresponding to the level to generate a level-specific anomaly metric includes:

providing the subset of the data to a machine learning model for the level to generate the level-specific anomaly metric, wherein the machine learning model is trained using historical data corresponding to the level.

5. The method of claim 4, wherein the machine learning model is an unsupervised machine learning model and further comprising:

determining that the level-specific anomaly metric corresponds to an anomaly;

in response to determining that the level-specific anomaly metric corresponds to an anomaly, providing the subset of the data and the level-specific anomaly metric to a supervised machine learning model to determine a severity of the anomaly for impact classification, wherein the supervised machine learning model is trained using the historical data corresponding to the level for anomalies, historical level-specific anomaly metrics, and historical indications of the severity of the anomalies.

6. The method of claim 5, wherein providing the indication of the anomaly includes:

generating, by the one or more processors, a ranked list of customers and components of the PON in need of repair based on one or more of: a severity of anomalies associated with each customer, a number of anomalies associated with each customer, a number of customers under a shared component, or a root cause location of the anomalies.

7. The method of claim 1, wherein combining the level-specific anomaly metrics includes:

generating a graph in accordance with the topology of the PON having nodes corresponding to the plurality of levels and edges corresponding to optical connections between the plurality of levels;

labeling one or more of the nodes in the graph based on historical patterns indicating stability or instability;

propagating labels from labeled nodes to unlabeled nodes based on one or more of:

patterns from connected nodes, similarity in subsets of the data, or similarity in level-specific anomaly metrics;

generating a likelihood of the anomaly based on labels assigned to the nodes; and detecting the anomaly in response to determining the likelihood exceeds a threshold.

8. The method of claim 1, wherein generating the likelihood of the anomaly includes:

generating a likelihood of an acute anomaly based on a first subset of the data obtained over an acute time window below a threshold amount of time; and generating a likelihood of a chronic anomaly based on a second subset of the data obtained over a chronic time window above the threshold amount of time.

9. The method of claim 1, further comprising:

for each of the plurality of levels:

generating feature vectors over a moving time window based on the subset of the data corresponding to the level; and generating the level-specific anomaly metric using the feature vectors.

10. The method of claim 9, wherein the feature vectors include a plurality of parameters including one or more of: a moving average, a variance, a percentile, or a drift for the plurality of parameters over the moving time window.

11. The method of claim 9, wherein the feature vectors for the level are normalized relative to peer components associated with the level.

12. The method of claim 1, wherein the subset of the data corresponding to the OLT level includes one or more of: an optical power, a signal attenuation metric from the OLT to the ONT, a bit error rate (BER), or a PON alarm.

13. The method of claim 1, wherein the subset of the data corresponding to the FDH level includes one or more of: a virtual optical average from ONTs under the FDH, or an aggregated alarm metric for the ONTs under the FDH.

14. The method of claim 1, wherein the subset of the data corresponding to the ONT level includes one or more of: a received optical power at the ONT, a transmitted optical power from the ONT, an estimated distance to the OLT, a deviation of optical power from the FDH compared to the ONT, a differential from the received optical power at the ONT to a received optical power at the OLT, or a local alarm at the ONT.

15. The method of claim 1, wherein the subset of the data corresponding to the local area network level includes one or more of: a received signal strength at the wireless network component, a system event at the wireless network component, a packet error rate at the wireless network component, a processor utilization at the wireless network component, a memory utilization at the wireless network component, or a latency metric at the wireless network component.

16. A computing device for detecting an anomaly in a Passive Optical Network (PON), the computing device comprising:

one or more processors; and a non-transitory computer-readable memory storing instructions thereon that, when executed by the one or more processors, cause the computing device to:

obtain data for a customer in a PON associated with a plurality of levels in a topology, the PON including an optical line terminal (OLT) optically connected to a plurality of optical network terminals (ONTs) via a plurality of optical fibers, wherein the plurality of levels include two or more of: a local area network level corresponding to a wireless network component that communicates with an ONT for the customer, an ONT level corresponding to the ONT for the customer, a fiber distribution hub (FDH) level corresponding to an FDH optically connected to the customer ONT, or an OLT level corresponding to the OLT optically connected to the FDH which is optically connected to the customer ONT;

for each of the plurality of levels, analyze a subset of the data corresponding to the level to generate a level-specific anomaly metric;

combine the level-specific anomaly metrics to detect an anomaly associated with the customer; and provide an indication of the anomaly to at least one of a user interface or another computing device.

17. The computing device of claim 16, wherein the instructions further cause the computing device to:

transmit a control signal to automatically reboot a component of the PON in response to detecting the anomaly.

18. The computing device of claim 16, wherein the instructions further cause the computing device to:

perform a root cause analysis to detect which of the plurality of levels is the root cause of the anomaly based on the level-specific anomaly metrics for the plurality of levels in the topology.

19. The computing device of claim 16, wherein to analyze a subset of the data corresponding to the level to generate a level-specific anomaly metric, the instructions cause the computing device to:

provide the subset of the data to a machine learning model for the level to generate the level-specific anomaly metric, wherein the machine learning model is trained using historical data corresponding to the level.

20. The computing device of claim 19, wherein the machine learning model is an unsupervised machine learning model and the instructions further cause the computing device to:

determine that the level-specific anomaly metric corresponds to an anomaly;

in response to determining that the level-specific anomaly metric corresponds to an anomaly, provide the subset of the data and the level-specific anomaly metric to a supervised machine learning model to determine a severity of the anomaly, wherein the supervised machine learning model is trained using the historical data corresponding to the level for anomalies, historical level-specific anomaly metrics, and historical indications of the severity of the anomalies.

* * * * *